(12) United States Patent
Toyama et al.

(10) Patent No.: US 6,225,547 B1
(45) Date of Patent: *May 1, 2001

(54) RHYTHM GAME APPARATUS, RHYTHM GAME METHOD, COMPUTER-READABLE STORAGE MEDIUM AND INSTRUMENTAL DEVICE

(75) Inventors: Motoki Toyama; Shigehito Mukasa; Toru Okubo; Tomoya Yamano, all of Kobe (JP)

(73) Assignee: Konami Co., Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,545

(22) Filed: Oct. 28, 1999

(30) Foreign Application Priority Data

Oct. 30, 1998 (JP) .................................................. 10-326145
Jul. 28, 1999 (JP) .................................................. 11-214435

(51) Int. Cl.[7] .............................. G10H 1/40; G10H 7/00
(52) U.S. Cl. ................................ 84/611; 84/609; 84/635; 84/649; 84/651; 84/667
(58) Field of Search .................... 84/600–607, 609–612, 84/615, 634–636, 649–653, 667, 477 R, 478, DIG. 6

(56) References Cited

U.S. PATENT DOCUMENTS

| 4,694,723 | 9/1987 | Shinohara et al. ..................... 84/609 |
|---|---|---|
| 5,270,475 | 12/1993 | Weiss et al. ........................... 84/603 |
| 5,393,926 | 2/1995 | Johnson . |
| 5,434,949 | 7/1995 | Jeong ................................... 704/270 |
| 5,491,297 | 2/1996 | Johnson et al. . |
| 5,511,053 | 4/1996 | Jae-Chang .............................. 369/54 |
| 5,670,729 | 9/1997 | Miller et al. . |
| 5,690,496 | * 11/1997 | Kennedy ............................... 84/610 |
| 5,723,802 | 3/1998 | Johnson et al. . |
| 5,777,251 | * 7/1998 | Hotta et al. ............................ 84/609 |
| 5,824,933 | * 10/1998 | Gabriel .................................. 84/609 |
| 5,915,288 | * 6/1999 | Gabriel .................................. 84/609 |
| 5,925,843 | * 7/1999 | Miller et al. ........................... 84/609 |
| 6,063,994 | * 5/2000 | Kew et al. .............................. 84/600 |

FOREIGN PATENT DOCUMENTS

| 0810581 | 12/1997 | (EP) . |
|---|---|---|
| 188400 | 8/1992 | (TW) . |
| 333641 | 6/1998 | (TW) . |

* cited by examiner

Primary Examiner—Robert E. Nappi
Assistant Examiner—Marlon Fletcher
(74) Attorney, Agent, or Firm—Jordan and Hamburg LLP

(57) ABSTRACT

Sound generation control and instruction operation evaluation is performed by sound group selection and a sound generation instruction, with a mimic guitar having selection buttons for selecting one of a plurality of sound groups bearing a series of sounds, and a picking blade for instructing the generation of a sound. The rhythm-matching game can be enjoyed relatively easily in a manner closer to a realistic state of playing an instrument.

24 Claims, 19 Drawing Sheets

| PLAYER 1 | RESULT | PLAYER 2 |
|---|---|---|
| 100% 1 2 3 | COOL | 1 2 3 100% |
| 100% 1 2 3 | GOOD | 1 2 3 100% |
| 100% 1 2 3 | MISS | 1 2 3 100% |
| 1 2 3 | MAX COMBO | 1 2 3 |
| 1 2 3 % | SECRET | 1 2 3 % |
| 01234567 | TOTAL SCORE | 01234567 |
| A | RANK | D |

PRESS START BUTTON
CREDITS 02

RHYTHM GAME APPARATUS, RHYTHM GAME METHOD, COMPUTER-READABLE STORAGE MEDIUM AND INSTRUMENTAL DEVICE

This application is based on patent application Nos. 10-326145 and 11-214435 filed in Japan, the contents of which are hereby incorporated by references.

BACKGROUND OF THE INVENTION

1. Field of the Invention

The present invention relates to a rhythm game apparatus for performing a musical rhythm-matching game and a rhythm game method, a computer-readable storage medium wherein a rhythm game program thereof is stored, and an instrumental device used in a rhythm game apparatus.

2. Description of the Related Art

Conventionally, there are game systems wherein sounds are matched in rhythm with background music, or wherein a short playing of around one phrase or so is added and played.

Also, an instrument which generates a cardiogram-like rhythm, which performs rhythm matching while watching a cardiogram-like rhythm, has been proposed (refer to Japanese Patent Publication (by PCT Application) No. 8-510849).

However, with the above-described conventional rhythm-matching, the player cannot perform the rhythm-matching game in a manner closer to reality of an actual instrument by fully using the right hand and left hand. Also, it is foreseen that, in the event that a rhythm-matching game fully using the right hand and left hand is attempted in a manner closer to reality, the complexity will increase to an extreme degree, to where performing the rhythm-matching game becomes difficult.

SUMMARY OF THE INVENTION

It is an object of the invention to provide a rhythm game apparatus, a rhythm game method, a computereadable storage medium for storing a rhythm game program, an instrumental device for use in a rhythm game apparatus which have overcome the problems residing in the prior art.

According to an aspect of the invention, a rhythm game apparatus comprises a sound data storage device for storing at least data concerning sounds, the sounds being sorted into a plurality of selective sound groups, a display device for displaying occurrences of sounds in each of the plurality of selective sound groups in accordance with time passing, an instrumental unit to which a game player operates. The instrumental unit is provided with a sound group selector operable by the game player to select a sound group, and an instructor operable by the game player to instruct generation of a sound. The operation of the game player is evaluated based on a time gap between the instruction timing of the instructor and the predetermined timing of a sound in a selected sound group.

According to another aspect of the invention, a method for producing a rhythm game, comprises the steps of giving a game player a visual display of occurrences of sounds in each of a plurality of selective sound groups in accordance with time passing; detecting a time gap between a predetermined generation timing of a sound in a selected sound group and an instruction timing of the game player to judge whether the sound is allowed to be generated; generating the particular sound based on the judgment; and evaluating the operation of the game player based on the detected time gap.

According to still another aspect of the invention, a computer-readable storage medium storing a program of executing the steps giving a game player a visual display of occurrences of sounds in each of a plurality of selective sound groups in accordance with time passing; detecting a time gap between a predetermined generation timing of a sound in a selected sound group and an instruction timing of the game player to judge whether the sound is allowed to be generated; generating the particular sound based on the judgment; and evaluating the operation of the game player based on the detected time gap.

These and other objects, features and advantages of the invention will become more apparent upon reading the following detailed description in conjunction with the accompanying drawings.

DETAILED DESCRIPTION OF THE PREFERRED EMBODIMENTS

Figure 1:
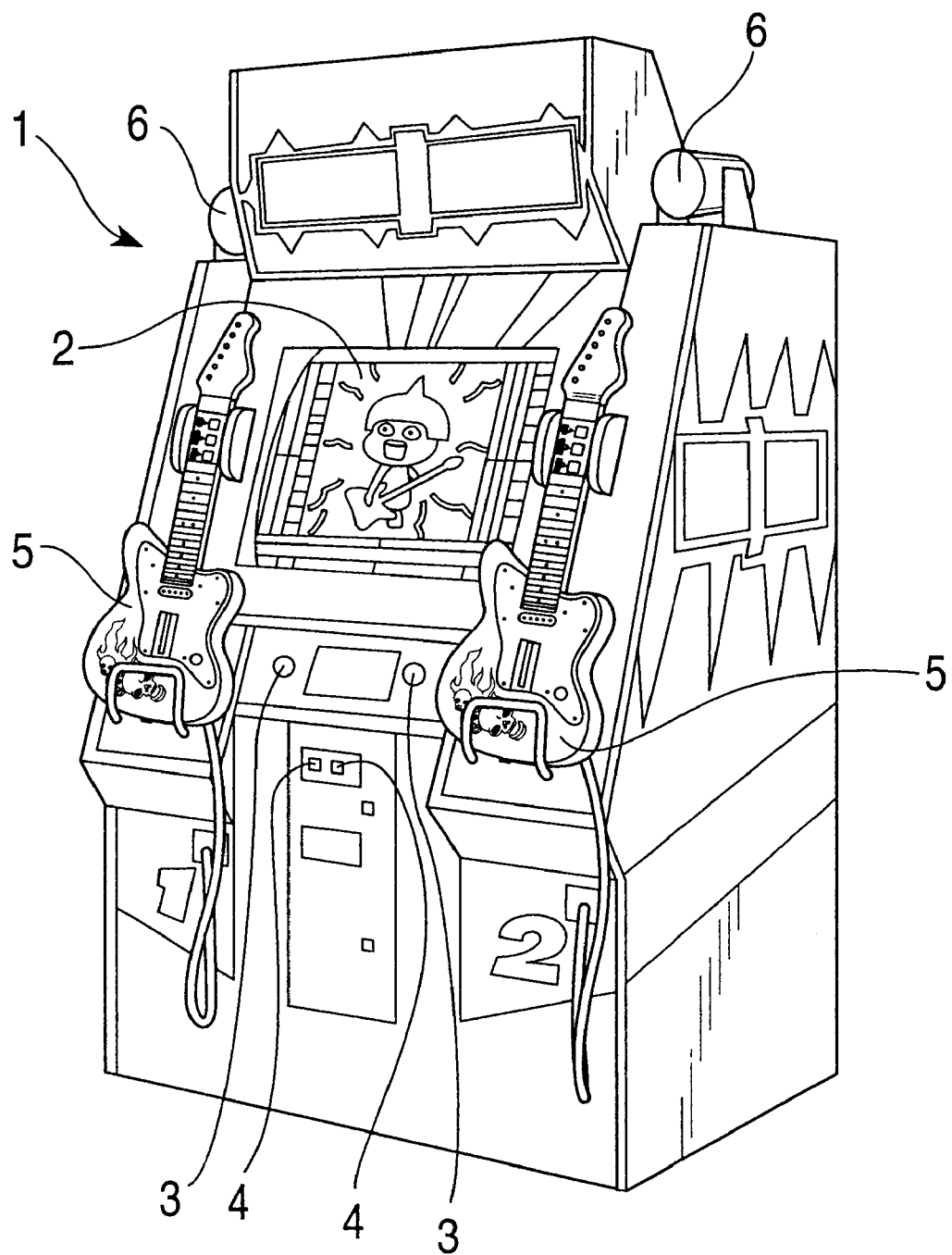
FIG. 1 is an external perspective view of a rhythm game apparatus according to an embodiment of the present invention.

A rhythm game apparatus of the invention is mainly provided with a sound data storage device, a display device, an instrumental unit, and an evaluator. The sound data storage device stores at least data concerning sounds, the sounds being sorted into a plurality of selective sound groups. The display device displays occurrences of sounds in each of the plurality of selective sound groups in accordance with time passing. The instrumental unit is operated by a game player, and includes a sound group selector operable by the game player to select a sound group, and an instructor operable by the game player to instruct generation of a sound. The evaluator evaluates the operation of the game player based on a time gap between the instruction timing of the instructor and the predetermined timing of a sound in a selected sound group. There is further provided a sound generator for generating an instructed sound.

The rhythm game apparatus may be further provided with a judger for judging whether the instruction timing of the instructor is within an allowable time range of the sound.

The sound generator may be made to generate the sound when the instruction timing is within the allowable time range, or may be made to generate the sound at a predetermined interval when the instruction timing is within the allowable time range. Also, the sound generator may generate a background sound. The sound data may include scale data and/or chord data.

The evaluator may evaluate the operation of the game player based on a total of differences with respect to a predetermined number of sounds. The evaluator may have for evaluation an addition parameter for a difference within a predetermined tolerance range and a subtraction parameter for a difference out of the predetermined tolerance range.

The display device may be provided with a graphic storage device for storing note screen data for visually guiding the instruction operation, and a graphic generator for generating an updated note screen in accordance with time passing, and an updated failure screen indicative of whether or not the instruction timing is within the allowable range.

One of the sound group selector and the instructor may be arranged for the right hand of the game player, and the other arranged for the left hand. It may be appreciated to make the instrumental unit in the form of a guitar. In this case, the sound group selector is configured into a plurality of neck buttons corresponding to the plurality of sound groups, respectively, and the instructor is configured into a picking unit.

The picking unit may be provided with a picking blade provided swingably, a restoring mechanism for restoring a blade portion of the picking blade into a reference position with respect to the instrumental unit, and a swing detector for detecting a swing of the picking blade to determine a sound generation timing. The restoring mechanism may include a pair of elastic members provided below the picking blade, one member of the pair being arranged on one swing side and the other member being arranged on the other swing side. Alternatively, the picking blade may be formed with a protrusion extending inside, and the restoring mechanism includes an elastic member for holding the protrusion of the picking blade in a swingable manner. There may be further provided a posture detector for detecting whether the instrumental unit is placed in a particular posture in a predetermined time so that the evaluator gives an additional score to the evaluation when the instrumental unit is placed in the particular posture in the predetermined time.

The instrumental unit or device for use with the rhythm game apparatus may be provided with a sound group selector which is to be operated by one of the both hands of a game player to select a sound group; and an instructor which is to be operated by the other hand of the game player to instruct the sound generator to generate a sound.

A rhythm game producing method of the invention comprises the steps of: giving a game player a visual display of occurrences of sounds in each of a plurality of selective sound groups in accordance with time passing; detecting a time gap between a predetermined generation timing of a sound in a selected sound group and an instruction timing of the game player to judge whether the sound is allowed to be generated; generating the particular sound based on the judgment; and evaluating the operation of the game player based on the detected time gap. The game player may be given a background music in connection with the displayed sound occurrences.

A computer-readable storage medium of the invention stores a program of executing the steps of: giving a game player a visual display of occurrences of sounds in each of a plurality of selective sound groups in accordance with time passing; detecting a time gap between a predetermined generation timing of a sound in a selected sound group and an instruction timing of the game player to judge whether the sound is allowed to be generated; generating the particular sound based on the judgment; and evaluating the operation of the game player based on the detected time gap.

A computer-readable storage medium of the invention stores a program of executing the steps of: giving a game player a visual display of occurrences of sounds in each of a plurality of selective sound groups in accordance with time passing; detecting a time gap between a predetermined generation timing of a sound in a selected sound group and an instruction timing of the game player to judge whether the sound is allowed to be generated; generating the particular sound based on the judgment; and evaluating the operation of the game player based on the detected time gap.

Further, the invention provides a product of computer program executing the steps of: giving a game player a visual display of occurrences of sounds in each of a plurality of selective sound groups in accordance with time passing; detecting a time gap between a predetermined generation timing of a sound in a selected sound group and an instruction timing of the game player to judge whether the sound is allowed to be generated; generating the particular sound based on the judgment; and evaluating the operation of the game player based on the detected time gap.

Next, a specific rhythm game apparatus embodying the present invention will be described with reference to the drawings. FIG. 1 is an external perspective view of a rhythm game apparatus according to an embodiment of the present invention. In FIG. 1, the rhythm game apparatus 1 has a certain degree of angle at the front upper portion of the housing, and a television monitor 2 for outputting various types of images relating to the rhythm game is provided to the center position of the inclined plane. Also, start buttons 3 are provided to the left and right at the near side below the monitor, with two coin deposit openings 4 being provided to the lower side thereof on the right and left. Further, mimic guitars 5 which are mimic instruments serving as the instrumental unit for the players to perform rhythm input for sound generation operation are provided to both the left and right sides of the monitor 2, respectively. Further, lamps 6 for staging effects for the played music piece are provided on the housing above the monitor 2.

In this way, two mimic guitars 5 are provided together, so that two players can each conduct input operation of each mimic guitar 5 and play the rhythm-matching game, or that one player can conduct operation of one mimic guitar 5 and play the rhythm-matching game. Whether one player or two players will play is determined by depositing a certain monetary value in both coin deposit openings 4 to the left and right, or by depositing a certain monetary value in one.

Figure 2:
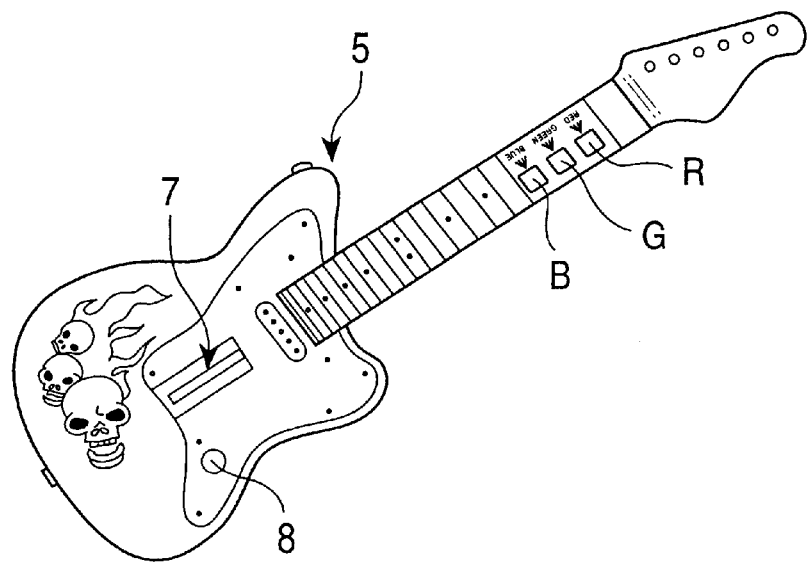
FIG. 2 is a configuration diagram of a mimic guitar shown in FIG. 1.
Figure 3:
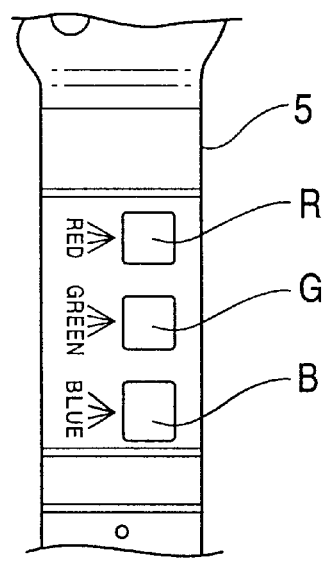
FIG. 3 is an enlarged diagram of a neck portion shown in FIG. 2.
Figure 4:
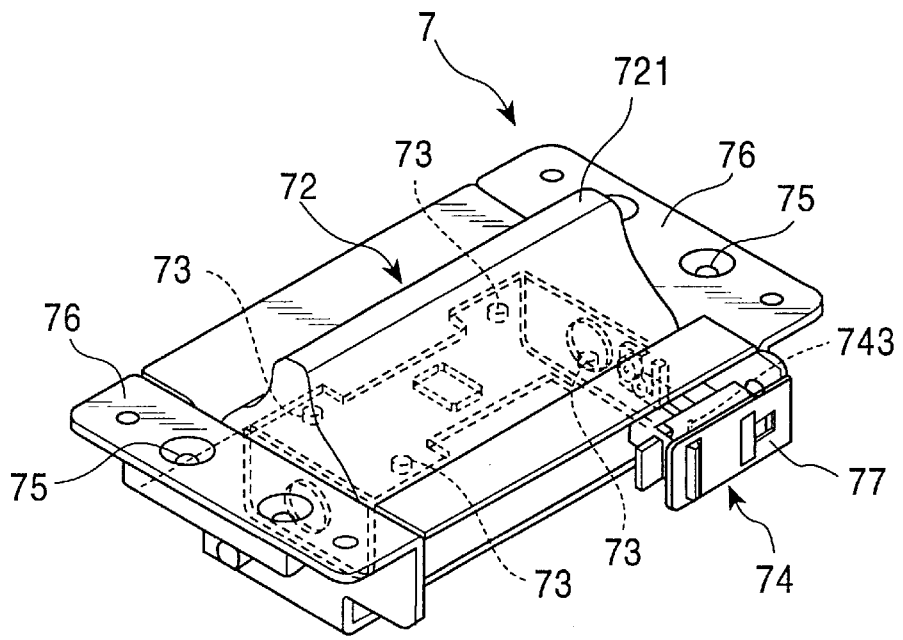
FIG. 4 is a perspective view of a picking unit attached to the mimic guitar shown in FIG. 2.
Figure 5:
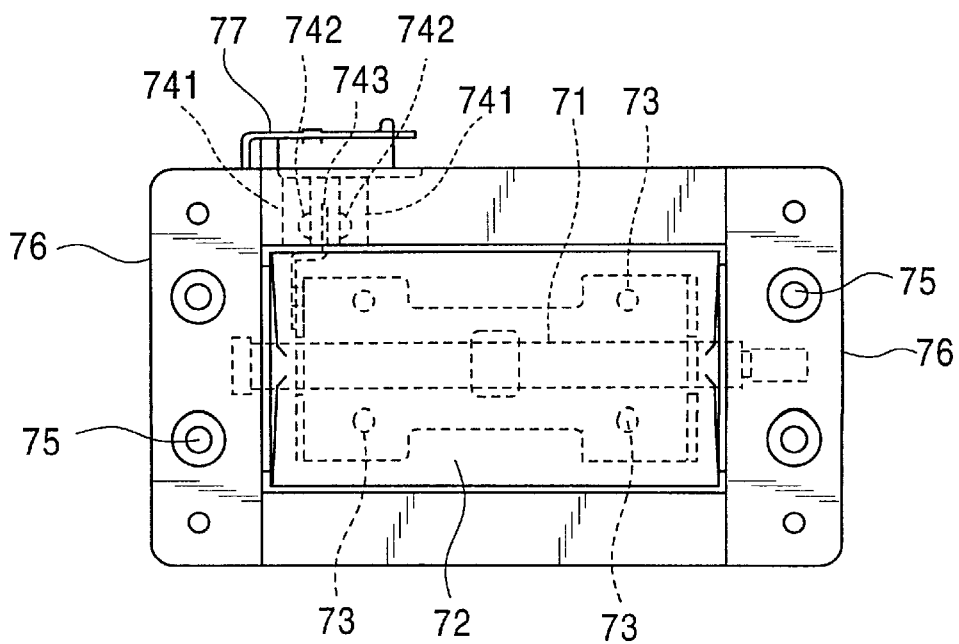
FIG. 5 is a plan view of the picking unit shown in FIG. 4.
Figure 6:
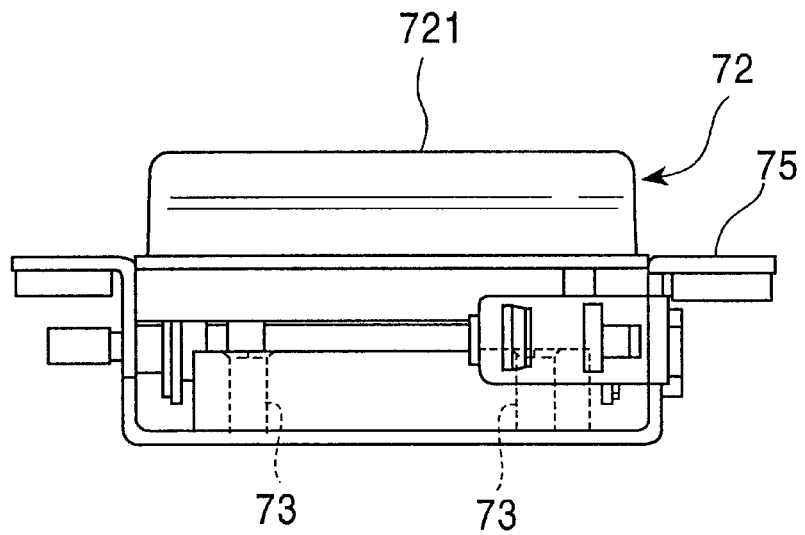
FIG. 6 is a frontal view of the picking unit shown in FIG. 4.
Figure 7:
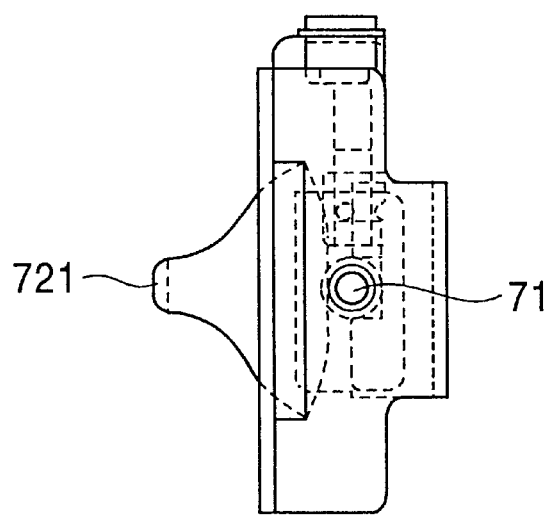
FIG. 7 is a side view of the picking unit shown in FIG. 4, in a used state.
Figure 8:
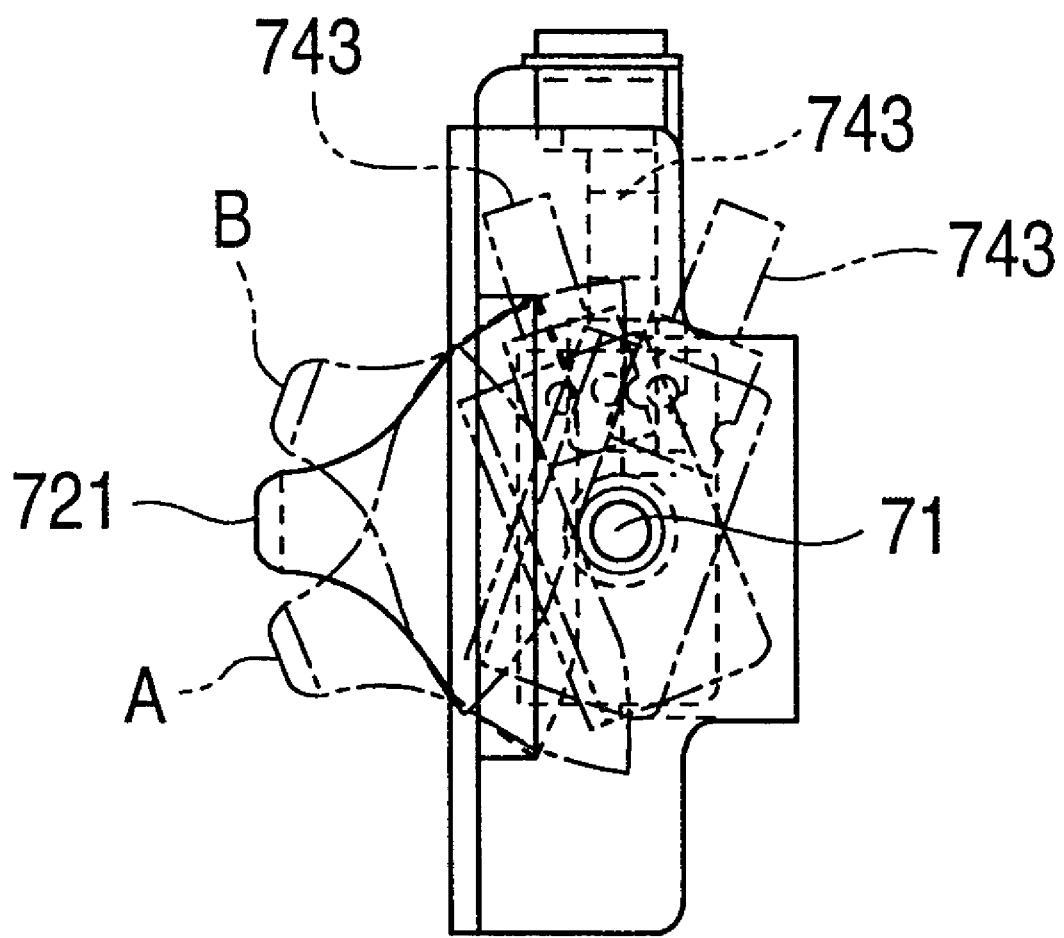
FIG. 8 is a diagram illustrating its movement at the time of activating the picking unit in FIG. 7.

FIG. 2 is a configuration diagram of the mimic guitar 5 shown in FIG. 1, and FIG. 3 is an enlarged diagram of the neck portion shown in FIG. 2. In FIGS. 2 and 3, the mimic guitar 5 is provided with three neck buttons R, G, and B, serving as a sound group selector for selecting one from the plurality of types or sound groups each bearing rhythm sounds for the played music piece, each sound following the time-wise group of the played music piece; a picking unit 7, serving as an instructor for instructing generation of a sound in the selected sound group by the selecting operation of at least one neck button of these neck buttons R, G, and B, and a rotary switch 8 provided below the picking unit 7 for switching added modes such as an echo mode in which the same type of sounds are generally generated in a sequential manner and a chorus mode in which different types of sounds are generally generated at the same time. These neck buttons R, G, and B are left-hand input means for inputting guitar chords and the like, and the picking unit 7 is a right-hand input means for inputting guitar picking; the left-hand and right-hand arrangements may be reversed.

FIGS. 4 through 8 are configuration diagrams of the picking unit 7 attached to the mimic guitar 5. In FIGS. 4 through 8, the picking unit 7 is comprised of a picking blade 72 wherein the tip portion of a rib-shaped piece 721 is swingably axially supported in the longitudinal direction centered around a shaft 71 within a certain angle range, an elastic member 73 which is positioned at the base portion of the picking blade 72 and serves as a restoring means for restoring the tip portion of the rib-shaped piece 721 automatically so as to face outwards, a turning detector 74 for detecting the turning of this picking blade 72, and an attachment plate 76 with attachment holes 75 for attaching to the main body of the mimic guitar 5, wherein sound generation signals are output for the first turning detecting timing of the picking plate by the turning detector 74 as the sound generation instructing timing, as described later.

This elastic member 73 may be a compression spring, or may be an elastic material such as rubber. The elastic member 73 is provided at four corners, i.e., two places for each swinging direction, so as to uniformly press the base portion of the picking blade 72 and maintain the balance thereof. Picking the rib-shaped piece 721 downwards as indicated by the imaginary line A shown in FIG. 8, causes the two elastic members 73 to the lower side to be compressed, and the two elastic members 73 to the upper side are stretched, so that the pressing force of the elastic members 73 on the picking blade 72 acts to cause the rib-shaped piece 721 to rock upwards as indicated by the imaginary line B shown in FIG. 8

Also, the swing detector 74 has oppositely-positioned element attaching members 741 attached to the attachment plate 76 with a holding member 77 introduced therebetween, transmitting photo-sensors 742 positioned to the element attaching members 741 so that the photo-emitting side and photo-receptor side are arranged in an oppositely facing manner, and a light-shielding piece 743 movable between the photo-emitting side and photo-receptor side, such that in the event that the picking blade 72 is stationary the light-shielding piece 743 shields the photo-sensor 742 so the photo-sensor 742 is in an off state, and in the event that the rib-shaped piece 721 is picked the light-shielding piece 743 moves in accordance with the rocking of the picking plate 72 and the photo-sensor 742 turns on, following which a sound generation instructing signal is output at a certain timing. This sound generation instruction signal is output after the lapse of a predetermined time from the first off time following on the photo-sensor 742 turning on. This is in order to approximate the state of an actual guitar string being picked to generate sound, in order to create a more realistic atmosphere.

Figure 9:
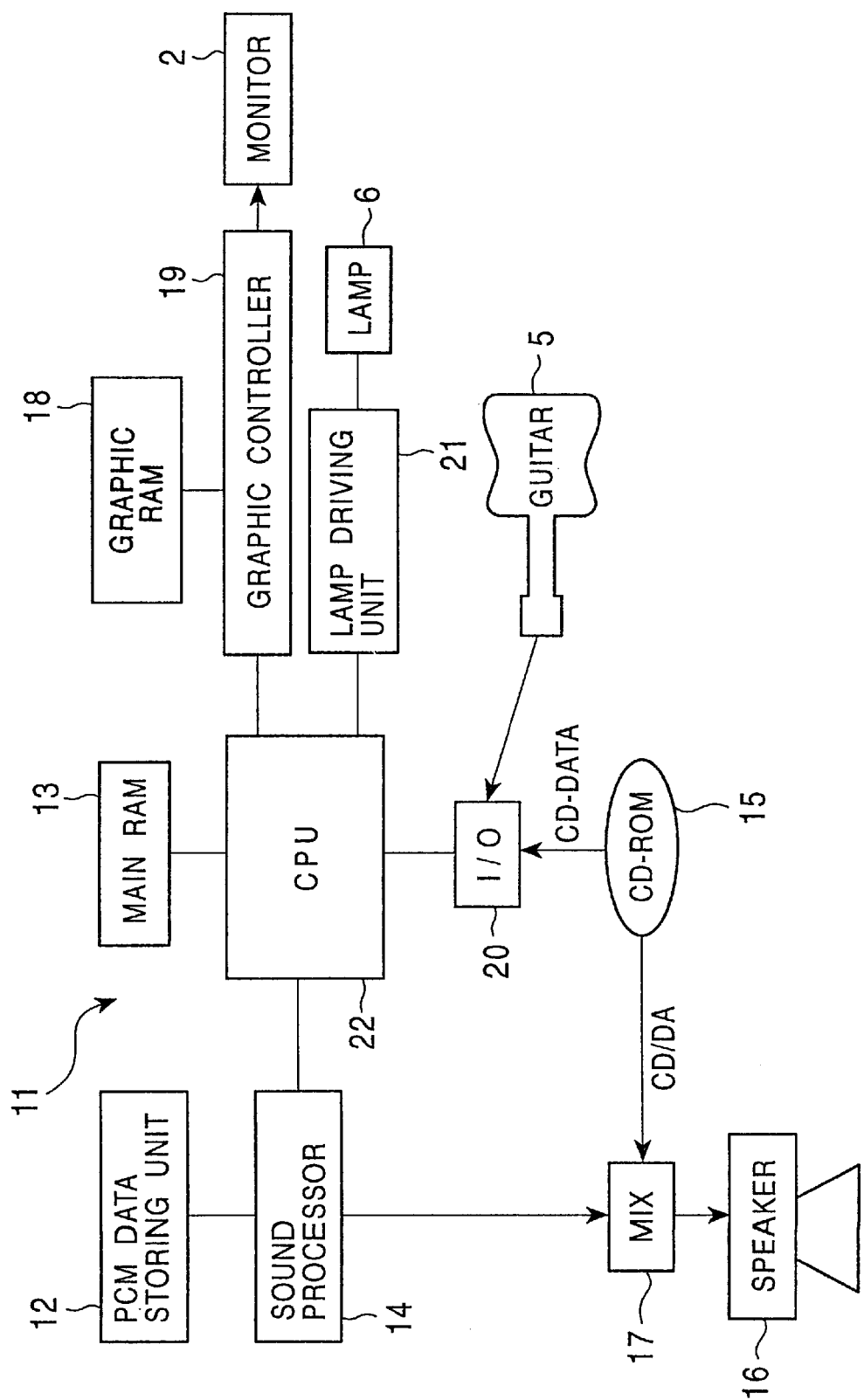
FIG. 9 is a block diagram illustrating a control configuration of the rhythm game apparatus shown in FIG. 1.

FIG. 9 is a block diagram illustrating the control configuration of the rhythm game apparatus 1 shown in FIG. 1. In FIG. 9, the control means 11 has a PCM data storage unit 12, a main RAM 13 capable of reading and writing various types of data, a sound processor 14 connected to the PCM data storage unit 12 for extracting sound generation data from the PCM data storage unit 12 and performing sound generation control, a mixing device 17 connected to the sound processor 14 for mixing the sound generation data from the sound processor 14 and background music data from a CD-ROM 15 for output to a speaker 16 serving as sound generation device, graphic RAM 18 serving as graphic storage means for storing image data for the monitor 2, a graphic RAM 19 connected to the monitor 2 for extracting the image data within the graphic controller 18 and performing display control to the monitor 2, an interface 20 for receiving input signals from the mimic guitars 5 and CD-ROM 15, a lamp driving unit 21 connected to the lamps 6 for driving the lighting of the lamps 6, and a CPU (Central Processing Unit) 22 for controlling each portion. A graphic controller is comprised of the main RAM 13, graphic RAM 18, graphic controller 19, and CPU 22.

The PCM data storage unit 12 stores each sound of sound generation data (type of sound data; type selected with buttons R, G, B) of a played music piece. Such sound generation data for multiple music pieces for each play level is stored in the PCM data storage unit 12. This sound generation data consists of sector No. provided to the CD-ROM 15, sound No. (Nos. provided to each of a series of sounds arrayed in a time system for each played music piece), sound generation length, and type of neck button (R, G, B). Also, as shown in the notes display 31 shown in FIG. 14, the graphic RAM 18 divides the rhythm sounds (notes bar 34 corresponding to the rhythm sounds) of a played music piece comprised containing at least rhythm sounds into certain intervals (which may be different for each sound, or may be the same) in the time direction C, and also stores each of a series of rhythm sounds constructed by appropriating to the three types (R, G, B) on the same time axis, for each sound, as image data for the above-described monitor 2. This image data is subjected to data loading from the CD-ROM 15 in the later-described step ST2.

Also, the CD-ROM 15 serving as the storage medium is comprised of a so-called ROM cassette wherein a plastic case houses ROM and the like storing the above image data, and also the background music data for played music pieces, and further storing the selective sound group data (type of neck button) and the specified generation timing data (sound No.) of each sound, and storing score data according the degree of matching of these, and storing program data such as programs for the rhythm game, operating system, and so forth. The recording medium may be comprised of an optical disk or a flexible disk or the like, instead of the CD-ROM 15.

Further, the graphic RAM 18 stores screens (FIGS. 12 through 18) according to the later-described game conditions and data related thereof, such as notes screen data for instruction operation for visually guiding the instruction operation with the mimic guitar 5.

The CPU 22 causes an not-shown reading device to read the program data and data related thereto (score data, selective sound group data, true sound generation timing data, etc.) within the CD-ROM 15 from the CD-ROM 15, to be written to the main RAM 13.

Also, the CPU 22 controls the graphic controller 19 according to the processing state of the stage selection, based on the program, and extracts necessary image data from the graphic RAM 18 and displays this on the monitor 2, while performing game stage selection processing by operation with the neck buttons R, G, B on the mimic guitar 5 and the start button 3. This stage selection processing includes selection of one player to play or two players to play, selection of difficulty, and selection of played music piece.

Figure 12:
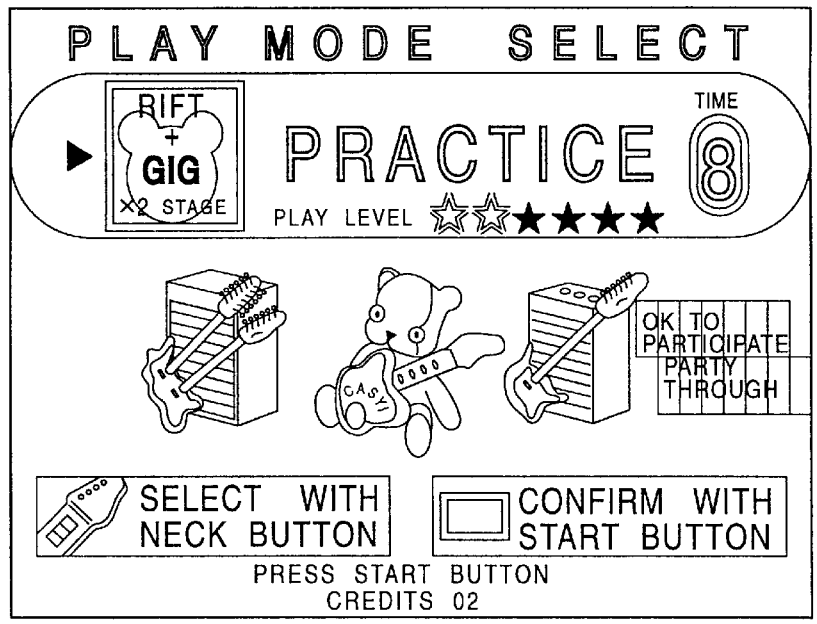
FIG. 12 is a difficulty selecting screen for the rhythm game apparatus shown in FIG. 1.

For example, in the event of selecting two players to play, this is selected by depositing a certain monetary amount from both left and right coin deposit openings 4 of the rhythm game apparatus 1, and the CPU 22 controls the graphic controller 19 to display a display screen on the monitor 2 such as shown in FIG. 12 ("credits 02" indicating two players to play), using the data within the graphic RAM 18.

Selection of difficulty involves a difficulty selection screen (guidance "select with neck button", "confirm with start button") on the monitor 2 such as shown in FIG. 12, the player sequentially selecting from the three stages of play level of advanced (expert), medium (normal), and beginner (practice) with the neck button R or the neck button G, and the CPU 22 controlling the graphic controller 19 according to the level of difficulty selected thereby to control display on the monitor 2 such that the title and number of shining stars change. For example, in FIG. 12, a screen of a bear holding a mimic guitar 5 is displayed on the monitor 2 with the title "PRACTICE" of the beginner stage and two of the six stars shining, from which pressing the neck button R once changes the screen displayed on the monitor 2 to that wherein a bear holding a different mimic guitar with the title "NORMAL" of the medium stage comes up and four of the six stars are shining, and further, pressing the neck button R once more changes the screen displayed on the monitor 2 to that wherein a bear holding another different mimic guitar with the title "EXPERT" of the advanced stage comes up and six of the stars are shining, and moreover, pressing the neck button R once more returns to the beginner "PRACTICE" screen. Incidentally, the arrangement is such that each time the neck button B is pressed, the play level changes in reverse from advanced to medium to beginner. Pressing the start button 3 according to the operation guidance "confirm with start button" determines the play level displayed on the monitor 2.

Figure 13:
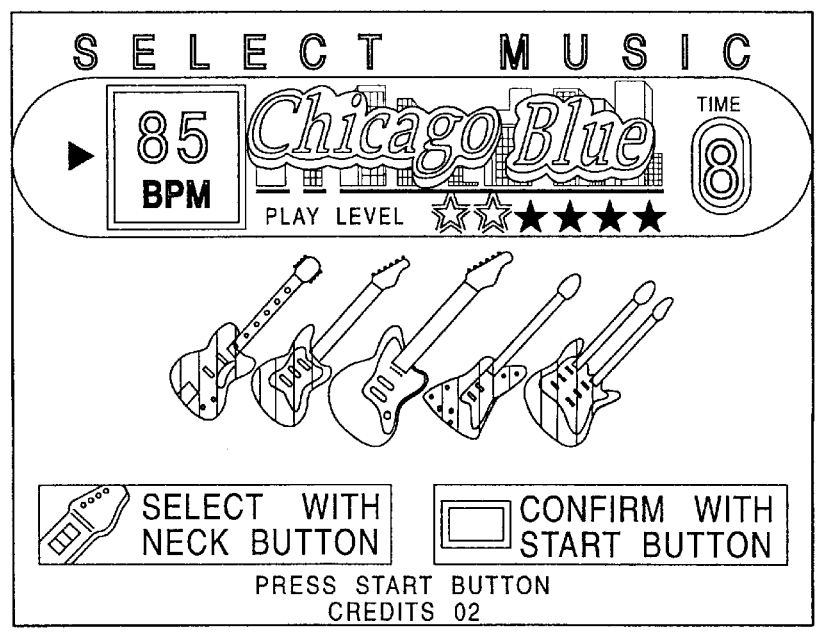
FIG. 13 is a music piece selecting screen for the rhythm game apparatus shown in FIG. 1.

Further, for selecting the played music piece, a plurality of (five in the present embodiment) mimic guitars with shapes according to the played music piece are displayed on the monitor 2 as shown in FIG. 13, and the title of a played music piece corresponding to the mimic guitar at the center (the center guitar is shining, and the other guitars are not shining, as represented by the hatching) is displayed on the monitor 2. From this display state, each time the neck button R is pressed, the five mimic guitars sequentially move to the right, with the mimic guitar situated at the far right moving to the far left, and the title of a played music piece corresponding to the mimic guitar at the center is displayed. Also, the arrangement is such that each time the neck button B is pressed, the five mimic guitars sequentially move in the opposite direction (to the left) as that with the neck button R. The title of the played music piece "Chicago Blue" is displayed at the title portion of the screen of the monitor 2 shown in FIG. 13, indicating the state that the same has been selected. In the event that this selected piece is suitable, the start button 3 is pressed according to the operation guidance "confirm with start button" on the monitor 2, thereby confirming the played music piece.

Also, the CPU 22 has a judging means for judging whether or not the sound data selected with the neck buttons (sound group selector) R, G, B, is instructed as operating timing within the certain interval by operating of the picking unit 7 according to the sound generation control procedures of the program; a sound generation controller for extracting one piece of sound generation data from the played music piece from the PCM data storage unit 12 with the sound processor 14 according to the type of neck button R, G, B from the mimic guitar 5 and the generation timing (sound No.) thereof, in a state affirmed by the judging means at least, this one piece of sound generation data being output to the mixing unit 17 where the one piece of sound generation data and background music data from the CD-ROM 15 are mixed and sound is generated from the speaker 16; and a display device for updating notes screen data according to the time-system group of the played piece according to the notes display control procedures of the program, and also performing display control on the monitor 2 of whether or not there has been a miss in the input operation with the mimic guitar 5; and rhythm input instrumental unit for following the rhythm input operating evaluating procedures of the program to check the selection operation of the mimic guitar 5, and compare the generation instruction timing with the true generation timing of the sound, and perform evaluation of instruction operation for the score data according to the degree of matching, whereby points are added to the score. The sound generation controller has difference amount detector and sound generation control means.

Figure 14:
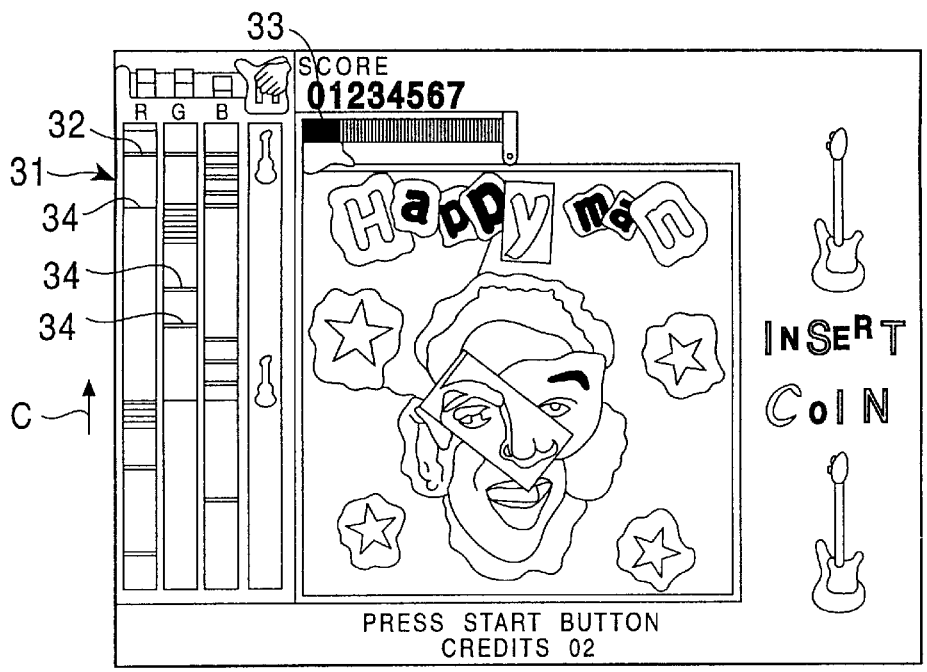
FIG. 14 is a game screen for one player playing the rhythm game apparatus shown in FIG. 1.
Figure 15:
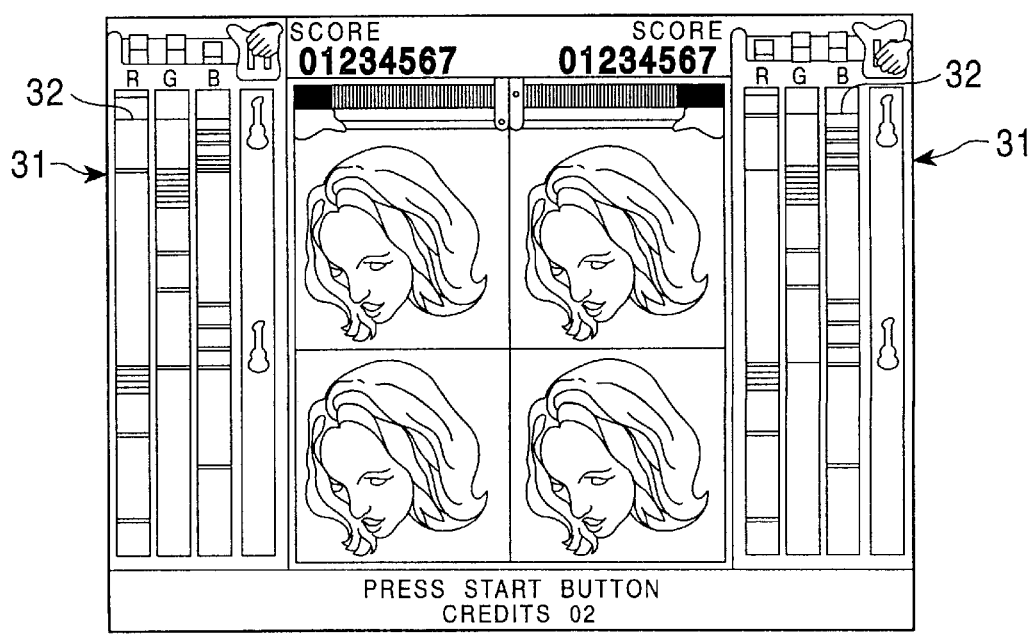
FIG. 15 is a game screen for two players playing the rhythm game apparatus shown in FIG. 1.

Detailed description will now be made regarding the sound generation control processing and the display control processing. The CPU 22 via the sound processor 14 obtains the CD sector No. where the sound generation data of the PCM data storage unit 12 corresponding to the next sound generation of the selected piece is to be positioned, and controls the graphic controller 19 such that image data is read from the graphic RAM 18 which is the graphic storage means to the next notes display position 31 so as to update it, thereby displaying on the monitor 2 as shown in FIG. 14 or FIG. 15. That is to say, the sector No. for which the CD head is searching is obtained at each interruption in the program, and the note display position 31 shown in FIG. 14 or FIG. 15 is moved one step upwards, so that the player selects and operates the neck button corresponding to the R, G, B notes bar 34 which has reached the reference line 32 at the topmost position, and also picks the picking unit 7.

In this way, the operator watches the notes display (neck button operating procedures) 31 at the left side of the monitor 2 in FIG. 14, and operates the neck button R, G, B, with the left hand along with the background music, and also operates the picking lever 72 with the right hand to input operating signals to the CPU 22. At this time, the CPU 22 obtains the degree of matching with the time-system data in the table, at the point that there is signal input within the certain timing period.

This degree of matching is the extent to which the type of neck button (R, G, B) operated and the timing of picking match. For example, in the event that the sound generation has the sector No. obtained at the time of picking input and the sector No. of the corresponding time-system data within the certain interval, and also that the next button written to the neck button type on the same table has been pressed, the sound data corresponding to the sound No. within the same table is emitted for the sound generation length of that sound data. Also, in the event that the type of neck button is correct, but the picking is made extending before or after the certain interval (a case wherein the picking is not contained within the certain interval), the operation is admitted, and comparison is made in the corresponding table before and after, and the close is emitted as sound. The display to the monitor 2 at this time is a "fail" display (gray). Incidentally, a "success" display is lit as a color corresponding to the operated neck button R, G, B with the notes bar 34 of the notes display 31. Also, in the event that the picking input time is within the certain interval but the neck button type is wrong, a sound No. is obtained from the table with the data of the closest same type of button. The display to the monitor 2 at this time also is a "fail" display (gray). In this way, the CPU 22 controls the sound processor 14 to obtain sound data from the PCM data storage device 12 for the sound selected by the player with the neck button at the timing of operating the picking lever, which is generated via the speaker 16.

Figures 16, 17:
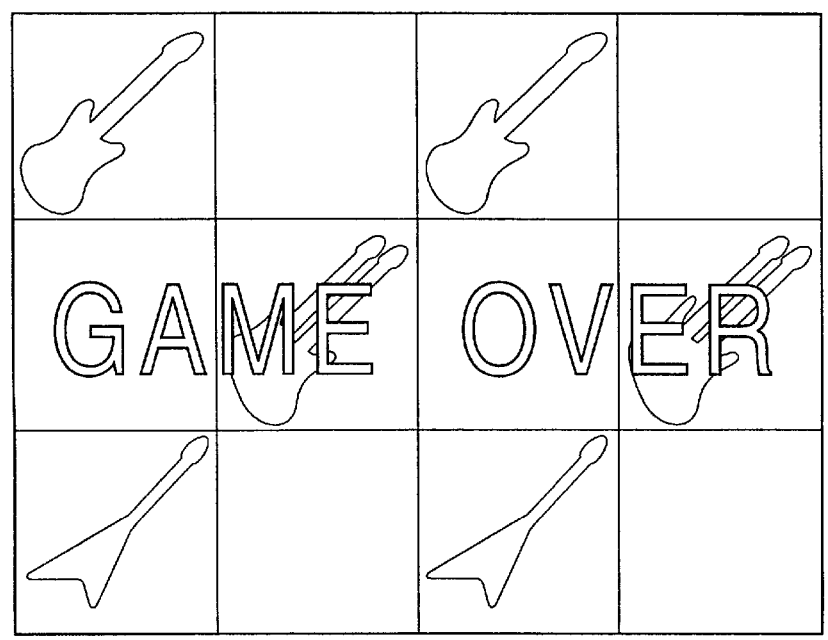
FIG. 16 is a stage results screen for the rhythm game apparatus shown in FIG. 1.
FIG. 17 is a game over screen for the rhythm game apparatus shown in FIG. 1.

Next, the instruction operation evaluating processing will be described in detail. The CPU 22 is arranged so as to extract score points from the score point table according to various conditions such as amount of picking difference from the reference timing range, different neck button types, whether continuous input operations are correct or not, whether there is no input of operating instructing signals which should be made within the certain timing period, and so forth, following the instruction operation evaluation procedures of the program and the game data, thereby calculating the score. Also, the CPU 22 is arranged to calculate the amount of time (gauge amount) necessary till sound generation. Based on the gauge amount calculation results and the score calculation results, the calculated score points are added to the accumulated score points and updated and stored to the main RAM 13, and at the same time the calculated gauge amount is subtracted from the remaining life amount and the remaining life amount is updated, so that the remaining life amount is displayed on the monitor 2 as a horizontal bar graph 33. In the even that there is no updated remaining life amount, the CPU 22 displays a "Game Over" display such as shown in FIG. 17 on the monitor 2, and the rhythm game is ended.

Figure 19:
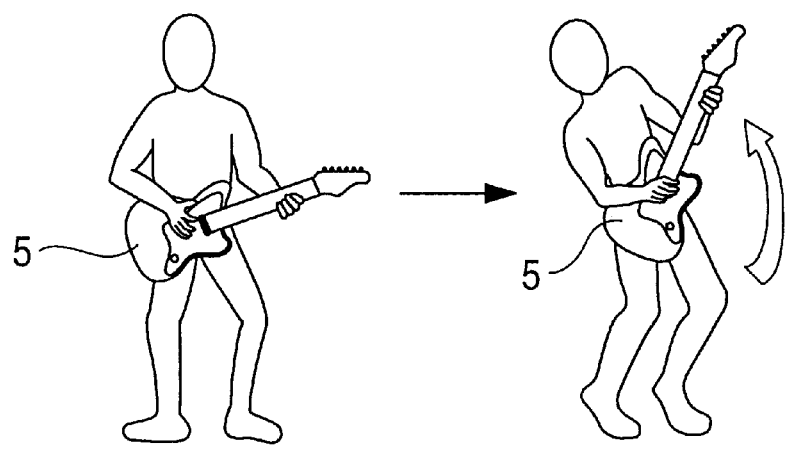
FIG. 19 is a model diagram illustrating the state of tower picking.
Figure 20:
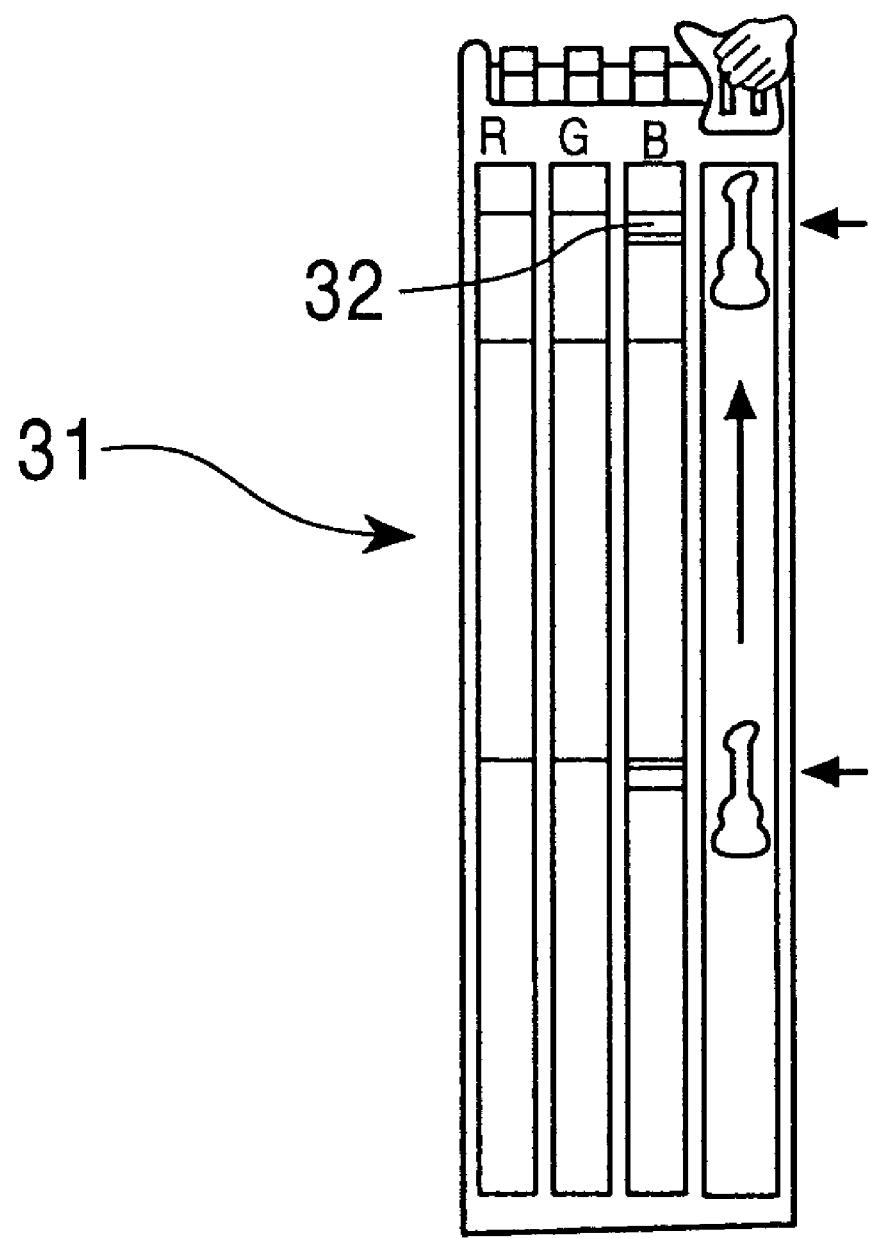
FIG. 20 is a notes display diagram for guiding the timing for tower picking.

Further, tower picking of the mimic guitar 5 will be described. An over-turn detecting unit (not shown) is set within the mimic guitar 5, so as to detect the angle of the mimic guitar 5 while playing. By adding an action of holding the mimic guitar 5 vertically at a certain point in the played music piece as shown in FIG. 19, the over-turn detecting unit detects this and outputs a detection signals, whereby the CPU 22 obtains high score points from the main RAM 13, adds to the score and stores in the main RAM 13, following the tower picking evaluation procedures of the program, and at the same time the arrangement is such that the lamp driving unit 21 is controlled to light the lamps 6, thereby staging a fanatical live performance. This action is in order to encourage over-acting while playing the game, so there are no minus actions taken such as reducing the score in the event that this action is not performed. Also, regarding the detection timing for this action, since there are differences in the action and many different operation images, a guitar mark appears to the right side of the notes display portion 31 from one frame ahead as shown in FIG. 20, this guitar mark ascends along with the group of the played music piece, so that the timing matches if the mimic guitar 5 is raised when this reaches the position of the reference line 32.

Figure 10:
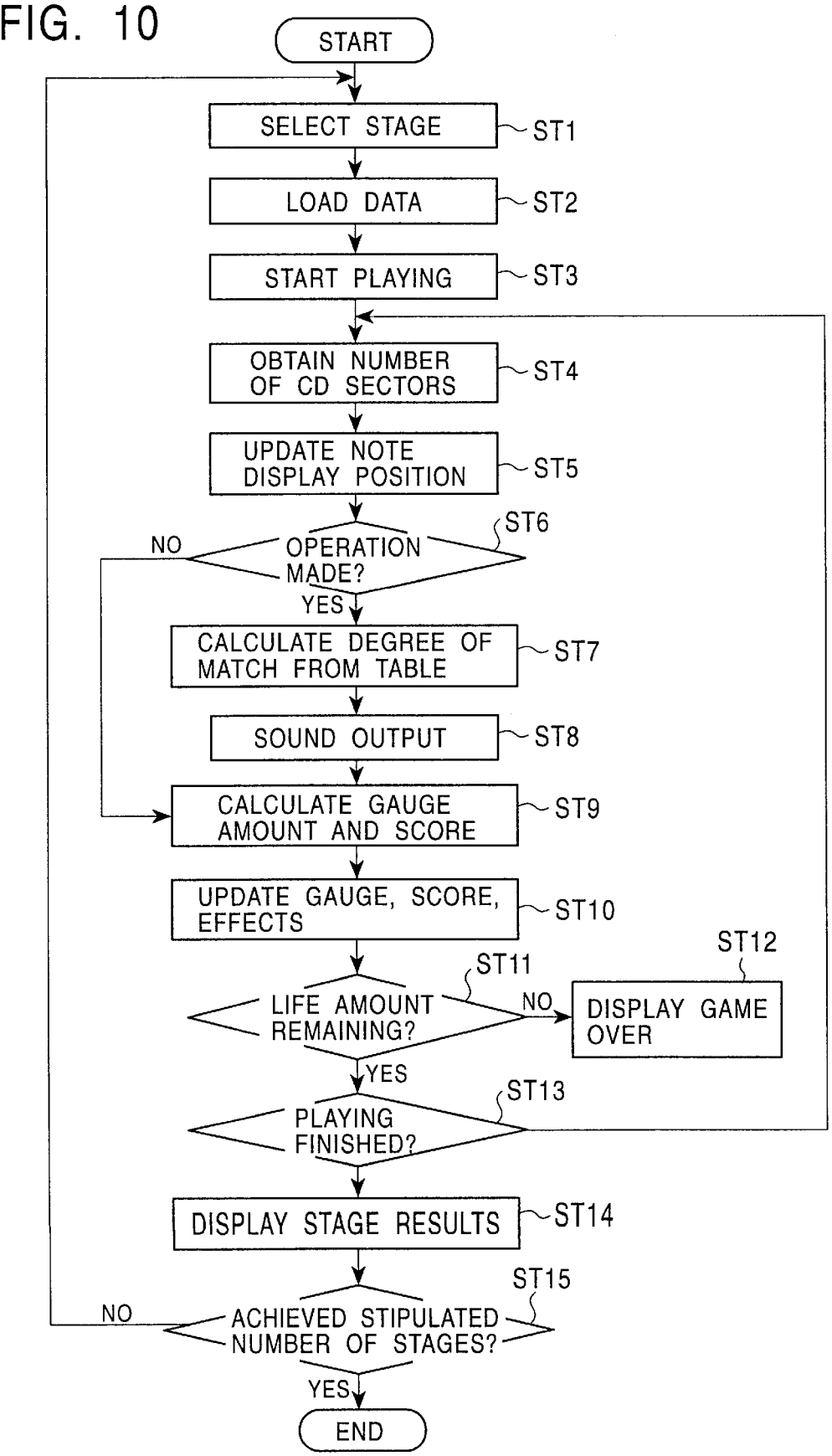
FIG. 10 is a groupchart illustrating an operation of the rhythm-matching game apparatus shown in FIG. 1.

The operation of the above configuration will be described below. FIG. 10 is a groupchart illustrating the operation of the rhythm-matching game apparatus shown in FIG. 1. As shown in FIG. 10, first, in step ST1, stage selection is made from the various stages. That is, whether one is to play or two is to play is selected by depositing a certain monetary amount in both coin deposit openings 4 on the left and right side of the rhythm game apparatus 1, or by depositing in only one. An initial display screen such as shown in FIG. 12 is displayed on the monitor 2, and a display such as "credits 02" is made in the event that two are to play. Also, coins for two have been deposited by only one person has taken a mimic guitar 5, so the display screen displays a comment such as "OK to participate partway through" shown in FIG. 12 is displayed in order to urge another to play.

Also, this display screen is a difficulty display screen, where selection is sequentially made from the three stages of play level of advanced (expert), medium (normal), and beginner (practice) with the neck button R or G, following the difficulty selection guidance "select with neck button", and for example, the beginner title "PRACTICE" with two of the six stars shining as shown in FIG. 12 is selected. Next, the start button 3 is pressed following the operation guidance of "confirm with start button" on the monitor 2, confirming the beginner level for the play level.

Further, selection of the played music piece is performed by five mimic guitars having shapes corresponding to the played music piece being displayed on the monitor 2 as shown in FIG. 13, and the played music piece being selected by pressing the neck button R. In FIG. 13, the title of the played music piece "Chicago Blue" corresponding to the mimic guitar at the center is displayed. In the event that this is suitable, the start button 3 is pressed following the operating guidance "confirm with start button" on the display screen, thereby confirming the played music piece.

Next, data loading is performed in step ST2. Programs instructing the procedures of the rhythm-matching game and related data other than background music data is read into the main RAM 13 from the recording medium CD-ROM 15 via the flash ROM on the main substrate. In other words, the background music is directly generated from the speaker 16 as background music sounds from the CD-ROM 15 shown in FIG. 9 via the mixing unit 17. Thus, when preparations for playing are completed, the game screen is displayed on the monitor 2 in step ST3. FIG. 14 illustrates the game screen for a single player, and FIG. 15 illustrates the game screen for two players. Here, the screen for a single player will be described, in order to facilitate ease of description. A notes display 31 is carried out to the left side of the monitor 2, showing the neck button operating procedures for the selected music piece, displayed with different colors for each of the neck buttons R, G, and B, and the playing of the selected piece thus starts.

Further, in step ST4 the CPU 22 obtains the CD sector No. that the CD is currently playing, and in step ST5 updates the position of the notes display 31. The player watches the notes display 31 (neck button operating procedures) at the left side of the monitor 2, and operates at least one of the neck buttons R, G, and B with the left hand, and also operates the picking lever 72 with the right hand, along with the background music, thereby outputting the instruction signal to the CPU 22. At this time, the CPU 22 judges whether or not there has been signal input within the certain timing period in step ST6.

At the point that there has been operating input by picking performed by the player in step ST6, in step ST7 the degree of matching of the type of operated neck buttons R, G, and B and the picking timing with the time-system data (the type of buttons and the true generation timing of sounds) in the table is obtained, and in step ST8, the CPU 22 controls the sound processor 14 to obtain sound data for the played music piece from the PCM data storing unit 12, based on the type of button selected with at least one of the neck buttons R, G, and B at the timing that the picking lever 72 was operated, which is generated via the speaker 16.

Further, in step ST9, calculation of the remaining life amount (gauge amount) wherein the game can be played, and calculation of the score is performed. Score points are extracted form the score point table according to conditions such as amount of picking difference from the reference timing range, wrong neck button types, correct continuous input operations, cases wherein there is no input of operating instructing signals which should be made within the certain timing period in step ST6, such as described above and the score is calculated. Also, the amount of time necessary for the operating input is calculated.

Further, based on the gauge amount calculation and score calculation results in step ST9, the gauge, score, and staged effects are updated in step ST10. The score points calculated in step ST9 are added to the accumulated score points and updated and stored in the main RAM 13. Also, the gauge amount calculated in step ST9 is subtracted from the remaining life amount and the remaining life amount is updated and recorded, and the remaining life amount is displayed on the monitor 2 as a horizontal bar graph, as shown by 33 in FIG. 14.

Further, in step ST11, the CPU 22 judges whether or not there is updated remaining life amount, and in the event that there is no remaining life amount a "Game Over" display such as shown in FIG. 17 is displayed on the screen on the monitor 2 in step ST12.

Further, in step ST13, judgment is made whether or not the selected piece has ended, by detecting whether or not there is an ending symbol which has been added to the end of the PCM data of the selected piece which the CPU 22 has obtained via the sound processor 14. In step ST13, in the event that the CPU 22 judges that the playing of the selected music piece has not ended, the group returns to step ST3, performs the series of processing for the next sound (steps ST3 through ST13), which is repeated until the playing of the selected music piece ends.

In the event that the CPU 22 detects the ending symbol which has been added to the end of the PCM data of the selected piece and thus judges in step ST13 that playing of the selected piece has ended, in step ST14 the CPU 22 controls the graphic controller to display a stage results display such as shown in FIG. 16 on the monitor 2 as an evaluation of the playing, based on the score calculation results.

Subsequently, in step ST15, the CPU 22 judges whether or not the stipulated number of stages (e.g., up to three selected pieces can be selected) has been achieved, and end in the event that this has been achieved, and returns to step ST1 to repeat the above series of actions in the event that this has not been achieved.

Figure 11:
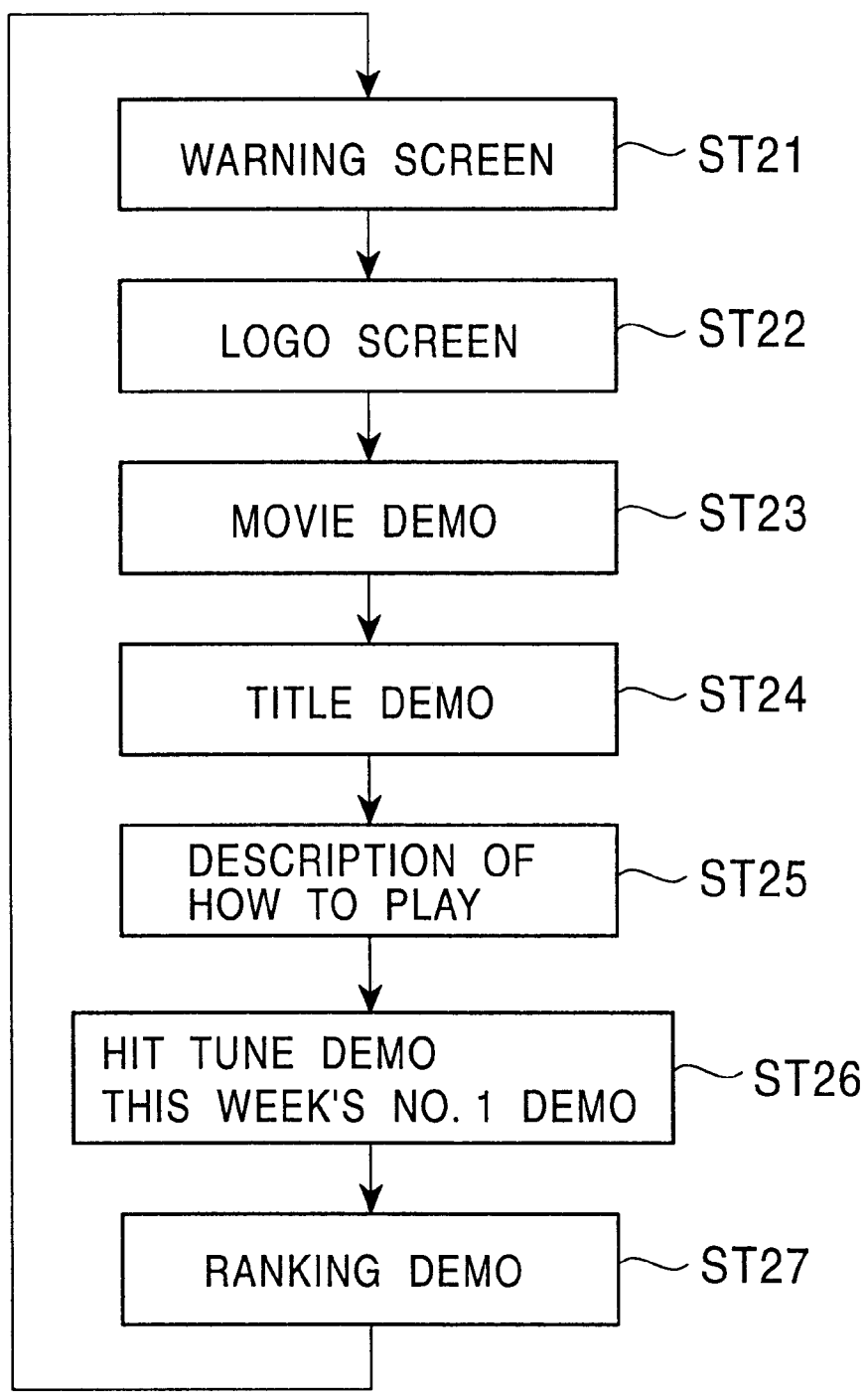
FIG. 11 is a groupchart illustrating a peripheral demo of the rhythm game apparatus shown in FIG. 1.

Next, description will be made regarding the peripheral demo. FIG. 11 is a groupchart illustrating the peripheral demo for the rhythm game device shown in FIG. 1. First, in step ST21, a warning screen displaying a warning text such as age restriction or the like is displayed on the monitor screen, in step ST22 the Konami logo mark is displayed, in step ST23, an opening video is displayed, in step ST24, the title for this rhythm-matching game is displayed, and further, in step ST25, how to play this rhythm-matching game (operation method) is explained.

Further, in step ST26, a noted piece demo is performed. That is, the number of times that each piece has been selected in the rhythm game is recorded following data initialization once every certain period such as a week, and that data is used to read the date and time, and a piece matching that period such as the season, day of the week, or the like is introduced, and also the piece with the greatest number of selections when demo looping is output as audio as the "No. 1 popular piece".

In step ST27, the name of the high-score player and the high score thereof for the week is displayed in order of high score, thus performing a ranking demo. Subsequently, the group returns to the warning screen in step ST21. Incidentally, the rhythm game apparatus 1 is arranged such that the player name can be input from input means in the event that a certain high-score value is passed.

In the event that a coin is deposited during the above routine, the title display in step ST24 is performed.

Figure 18:
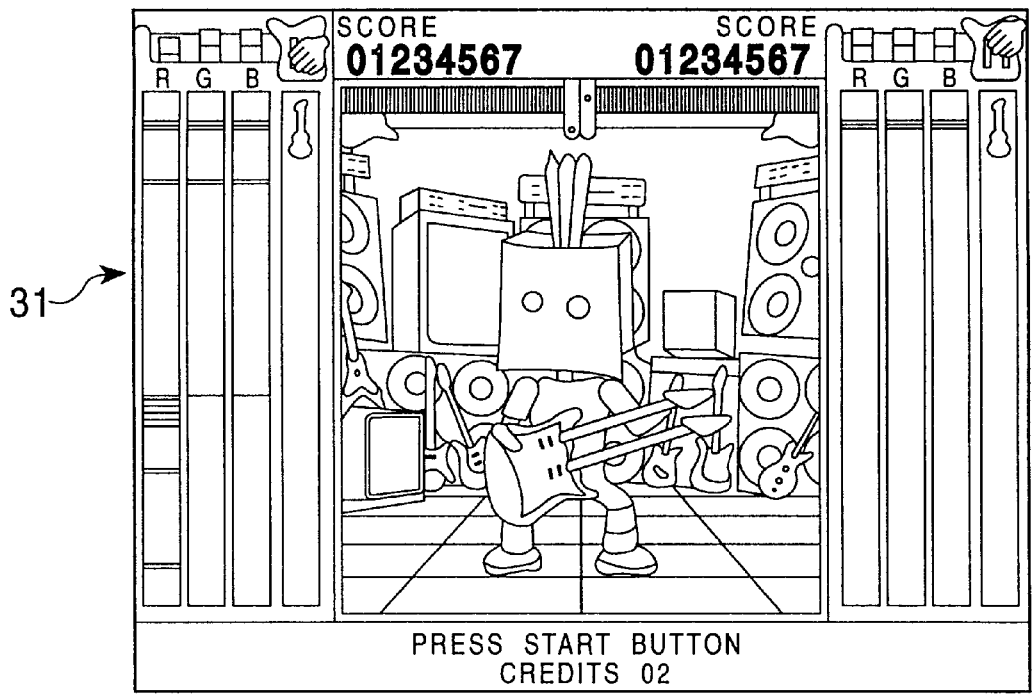
FIG. 18 is a practice refrain stage screen for the rhythm game apparatus shown in FIG. 1.

The operation of the refrain mode for practice will be described. When the setting for the refrain mode is made, first, a teacher for performing a model performance appears on the monitor 2 and plays a certain practice piece, which the player listens to and learns the sense of timing. Next, a monitor screen such as shown in FIG. 18 is displayed, and the neck button operating procedures for that practice piece are displayed on the position of the notes display 31, along with which at least one type from the neck buttons R, G, B and picking is performed, whereby sound is generated according to the type of neck button and picking timing. In the event that the type of neck button and picking timing of the player match that of the teacher, the notes bar 34 of the notes display 31 is displayed with the colors R, G, and B, corresponding with the types of neck buttons, and in the event that this does not match, the RGB colors disappear and become gray, thereby allowing judgment whether or not this has matched.

The sound generation control and instruction operation evaluation is performed according to the sound group selection (type of buttons R, G, B) with the left hand of the mimic guitar 5 and the instruction timing with the right hand, so a rhythm-matching game can be enjoyed relatively easily in a manner closer to a realistic state of playing an instrument, fully using the right hand and left hand.

When conducting this rhythm-matching game, the changing sound group selection and the true sound generation timings arc displayed on the monitor 2, so the rhythm-matching game can be performed in an easier and more sure manner, such that rhythm-matching becomes easier for even relatively difficult pieces, so the game becomes even more enjoyable.

The present embodiment is a case wherein the rhythm game apparatus 1 is applied to playing with a mimic guitar 5, and the player can perform the rhythm-matching game in a manner closer to a realistic state using the right hand and left hand.

Further, according to the picking unit 7 of the present embodiment, a simpler configuration can be used to obtain a realistic feel close to that of picking a mimic guitar 5, and more precise generation instruction can be attempted.

The sound generation is made based on the degree of matching of the sound group selection and instruction timing, so sound generation according to the played music piece can be made in a more natural manner.

The way of holding the rhythm input instrumental unit 7 can be changed with the sensation of a live performance, such that in the case of a mimic guitar 5, the action of raising along with the music allows the rhythm-matching game to be enjoyed in a more fanatical manner.

Figure 21:
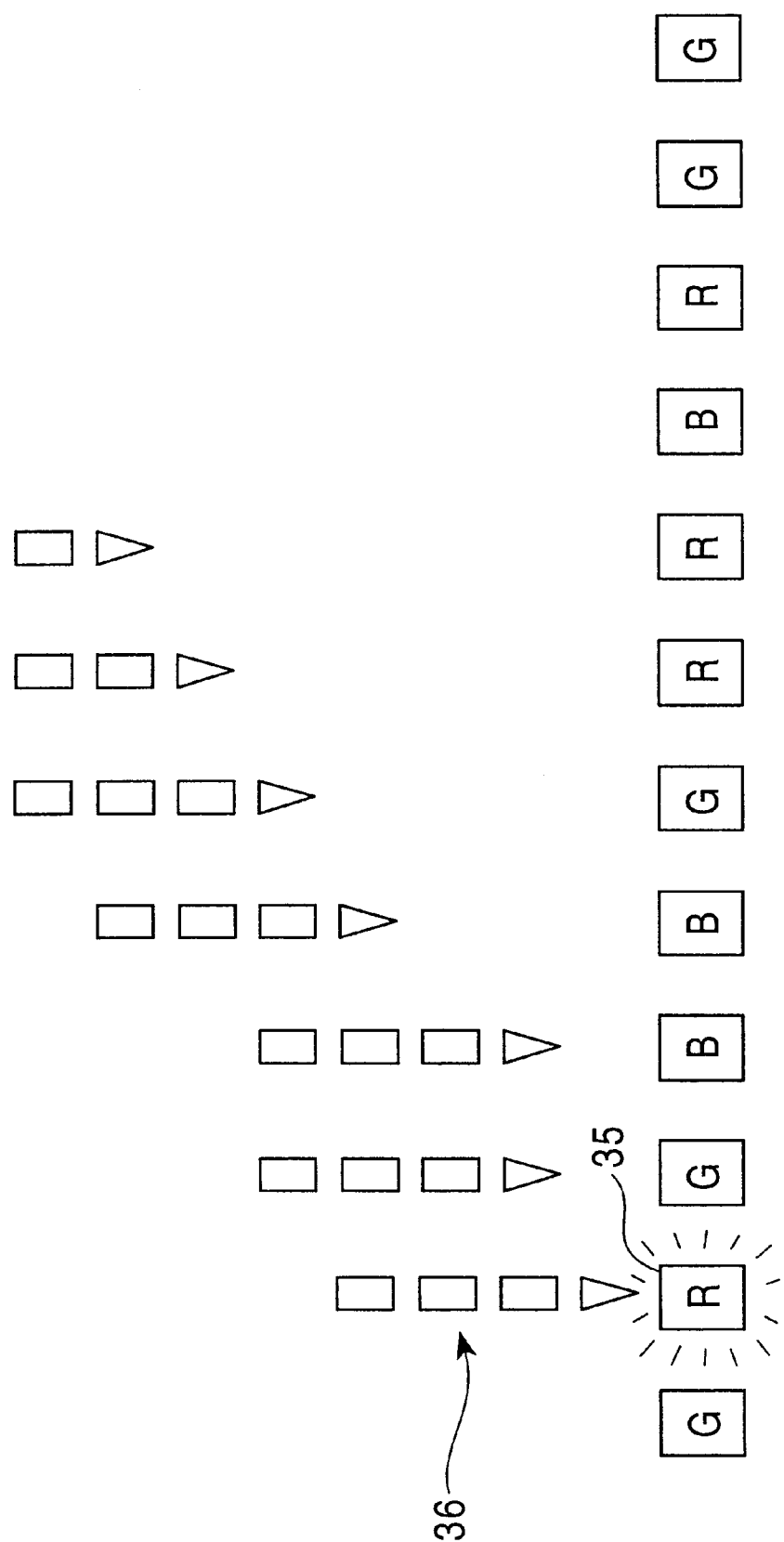
FIG. 21 is a diagram illustrating another embodiment of the notes display portion.

Incidentally, though the configuration with the present embodiment has been described as with the notes display 31 in FIG. 14, as shown in FIG. 21, the display for instructing the sound generation timing with the display device has the identification marks 35 being sequentially display by scrolling from one side of the display screen of the display means (monitor 2) to the other side, and timing marks 36 are moved and displayed so as to head for the corresponding identification marks 35 from the position generally corresponding to the identification marks 35, in a direction at right angles with the above scrolling direction, so that at the point that the display position between the identification mark 35 displayed at the other-most side and the timing mark 36 corresponding to this identification mark 35 reach a certain relation, preferably the point of matching, this is instructed as the sound generation timing. In this example shown in the Figure, the one side of the display screen is the right side of FIG. 21, and the other side is the left side in FIG. 21.

Incidentally, the present invention is not restricted to the above embodiment; rather, the following variations can also be employed.

(1) The sound generation needs only to contain rhythm sound, out of rhythm sound, scales, and chord sounds (chords).

(2) The rhythm input instrumental unit 7 is configured such that the picking blade 72 swings, but the present invention is not restricted to this, and an arrangement may be made wherein this slides; in effect, the picking blade 72 should be configured swingably.

(3) The instruction timing of the instructor as to the sound data instructed as operating timing and the operating timing display instruction are compared, and the instruction operation is evaluated based on the amount of difference thereof, wherein the evaluation means may be evaluated form the total amount of difference obtained by accumulating the difference amount to each piece of sound data, or the evaluator may set a tolerance range before and after the operating timing for each sound data, and calculate score by accumulating subtraction parameters set according to the smallness of the amount of being off within the inner side of the boundary of the tolerance range as a reference thereof, and addition parameters set according to the greatness of the amount of being off at the outer side thereof.

(4) In the node display 31, the notes bars 34 of rhythm sounds sequentially move upwards along with elapsing of time, toward the reference line 32, with the point of matching the reference line 32 being the operating timing, and here, the notes bars 34 move, but the invention is not restricted to this, so the reference line 32 may move, or the reference line 32 and the notes bars 34 may move, with the overlapping point being the operating instructing timing.

(5) The arrangement is such that one or multiple pieces can be selected from five pieces for three stages of play levels, advanced (expert), medium (normal), and beginner (practice), but an arrangement may be made wherein multiple pieces (e.g., two) other than the five are hidden, and at the point that the selection of pieces remaining is close to being depleted, the hidden two pieces then appear on the monitor 2, so as to be selectable. This reduces the unfairness for individuals selecting pieces at the point that the selection of pieces remaining is close to being depleted, and the rhythm-matching game can be enjoyed more.

(6) A description has been made using mimic guitars 5 as the instrumental unit, but the invention is not restricted to this, and can be applied to instruments such as cellos, violins, ukuleles, shamisens, kotos, etc. In the case of cellos or violins, a bow-like member would be used instead of the picking.

(7) The three neck buttons are provided, but this number may be one, or any other number, and in the case of a plurality thereof, this would mimic a guitar. Also, the operation input to the neck button may be performed to one neck button, or simultaneously with multiple neck buttons.

(8) The one rhythm input instrumental unit 7 having a picking blade 72 is provided, but the invention is not restricted to this, and a plurality thereof may be provided. In this case, the more picking blades 72 there are provided, the more realistic the playing becomes, and in the event that six or twelve are provided for example corresponding to the strings on a guitar, guitar accompaniment and arpeggio, or even playing of melody and chords separately can be performed, thus coming closer to guitar playing and allowing the game to be enjoyed more.

(9) The sound generation controller is configured so as to output the sound data instructed as the operating timing to the sound generation device and be generated, but the invention is not restricted to this, and the sound generation device may be controlled so as to conduct sound generation only of background music, without outputting instructed sound data to the sound generation device, with evaluation of the operation being displayed and output in the same manner as with the above embodiment.

(10) The present embodiment uses the configuration shown in FIGS. 2 through 8 for the mimic guitar, but the present invention is not restricted to this. For example, such as shown in FIGS. 22 and 23 can be used.

This mimic guitar 80 has three neck buttons R, G, and B, serving as the rhythm sound selecting means (sound group selector) for selecting the type of rhythm sound for each sound following the time-wise group of the played music piece from the plurality of rhythm sounds of the played music piece, a picking unit 83 serving as sound generation instructing member for instruction the generation of a sound in the sound group selected by the selecting operation of at least one neck button of these neck buttons R, G, and B, a push switch 81 provided lower than the picking unit 83 for switching added modes such as the echo mode (wherein generally the same type of sounds are generated in a sequential manner) and chorus mode (wherein different types of sounds are generated generally at the same time), and a push switch 82 for starting playing. These neck buttons R, G, and B are left-hand input means for inputting guitar chords and the like, and the picking unit 83 is a right-hand input means for inputting guitar picking; the left-hand and right-hand arrangements may be reversed.

Figure 22:
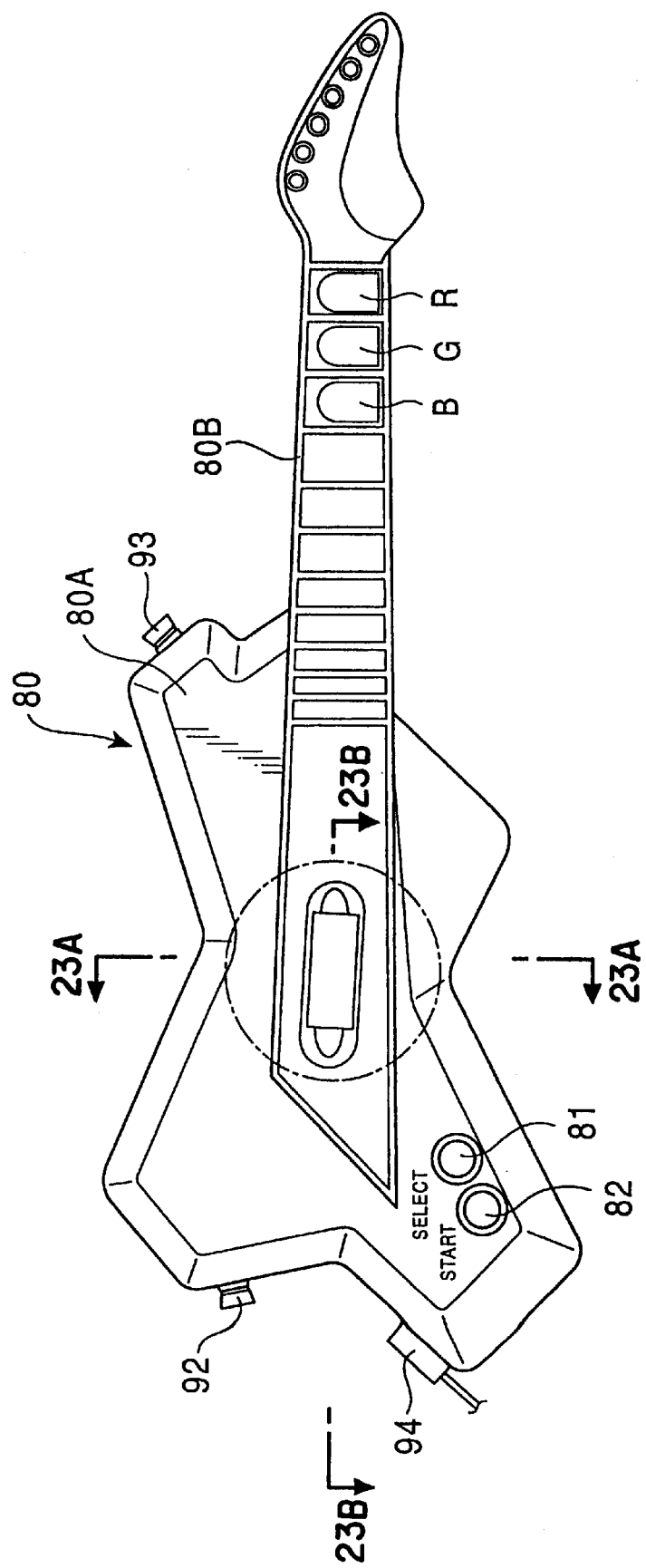
FIG. 22 is a frontal diagram illustrating another example of a mimic guitar used with the present invention.
Figure 23A:
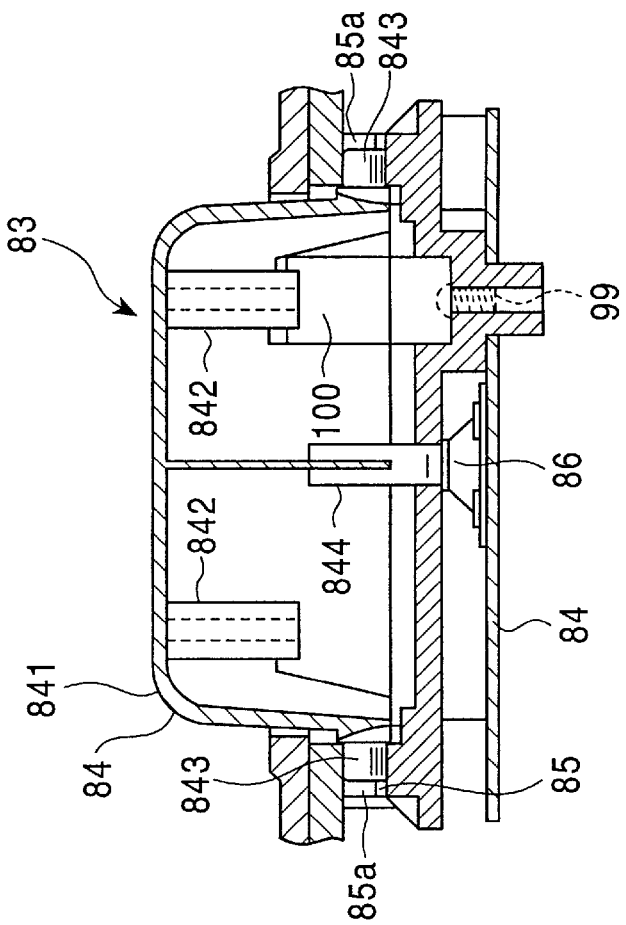
FIG. 23A is a cross-sectional view along line 23A—23A in FIG. 22.
Figure 23B:
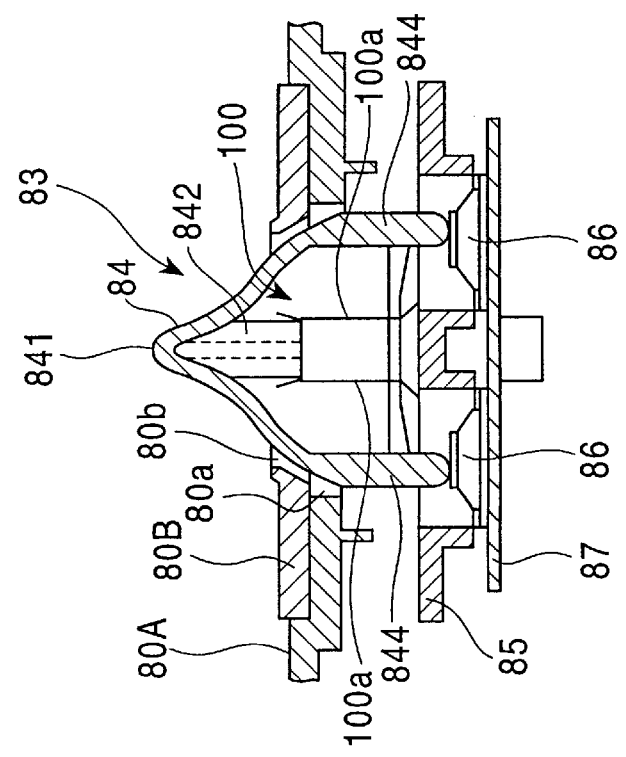
FIG. 23B is a cross-sectional view along line 23B—23B in FIG. 22.

FIGS. 23A and 23B are configuration diagrams of the picking unit 83 attached to the mimic guitar 80 shown in FIG. 22.

Figure 24:
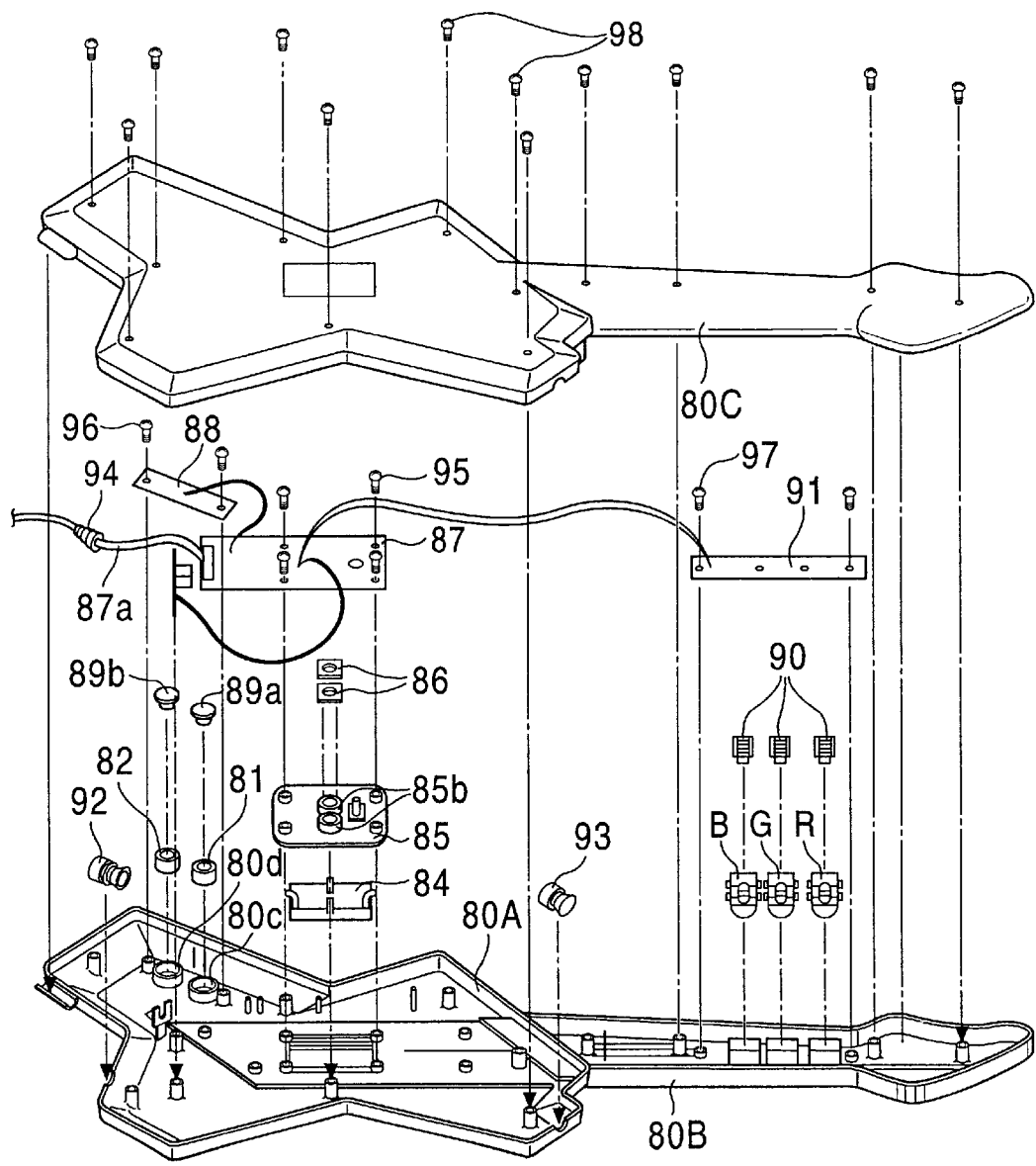
FIG. 24 is a disassembled perspective view of the mimic guitar shown in FIG. 22.

This picking unit 83 has a picking blade 84, an elastic nipping member 100 swingably supporting this picking blade 84, and swing detector 86 for detecting the swinging of the picking blade 84 provided to both sides of the base of the picking blade 84. Also, as shown in FIGS. 22 through 24, this mimic guitar 80 is comprised of a main body 80A, a neck unit 80B to which the neck buttons R, G, and B are provided, and a rear unit 80C, with an opening 80a provided in the main body 80A and an opening 80b provided in the neck unit 80B generally matching.

The picking blade 84 is formed so as to have a mountain-shaped cross-sectional form with the base opened, having an apex 841, two protrusions 842 formed protruding at a certain thickness downwards from two locations on the inner side of the apex 841, two shaft portions 843 having round cross-sectional forms protruding outwards from both sides, and two pressing portions 844 wherein the wall thickness of the picking blade 84 has been made thick from around the center in the height direction to the bottom side at the general center portion in the longitudinal direction at the inner plane. The pressing portions 844 act to press the swing detector 86 in the swinging direction, by the swinging of the picking blade 84.

The shaft portions 843 are swingably supported at recessed bearings 85a provided to the attachment member 85 linked to the main body 80A via later-described screw 95. In this supported state, the apex 841 side protrudes outwards through both openings 80a and 80b.

Also, one of the two constant thickness protrusions 842 is supported by an elastic nipping member 100 having a general shape of a box with one side open, attached to the attachment member 85 with a screw 99. Incidentally, the two protrusions 842 are provided at symmetrical positions in the longitudinal direction of the picking blade 84. This elastic nipping member 100 is formed of a spring material, has two nipping portions 100a, and the protrusion 842 is inserted between the two nipping portions 100a. Accordingly, when the picking blade 84 is picked and rotates, the constant thickness protrusion 842 tilts and the gap between the two nipping portions 100a begins to open, so conversely the two nipping portions 100a attempt to close. Thus, the picking blade 84 returns to the original reference position.

With the picking unit 83 this configured, picking the picking blade 84 toward a swinging direction causes the swing detector 86 at one side to press against the pressing portion 844 at the relevant side. The swing detector 86 outputs a sound generation instruction signal as a sound generation instruction timing at the point at that a certain amount of time has elapsed from the point of pressing thereof. The reason that such a time lapse is provided is to come closer to the state of an actual guitar string being played and generating sound, thereby creating a more realistic feel. Also, when the above picking is performed, the constant thickness protrusion 842 tilts and the gap between the two nipping portions 100a begins to open, so conversely the two nipping portions 100a attempt to close, so the picking blade 84 returns to the original reference position. The above is the same even in the case that the picking blade 84 is picked in the other swinging direction, though the relevant swing detector 86 is different.

Also, with this configuration, the protrusion 842 is inserted between the two nipping portions 100a to support the picking blade 84, so there is the advantage that not only the picking unit 83 but also the mimic guitar 80 can be assembled extremely easily.

Next, the assembly process for the mimic guitar 80 will be described with reference to FIGS. 24 through 30. FIG. 24 is a disassembled perspective view illustrating the overall assembly state, and FIGS. 25 through 30 are perspective view illustrating the assembly states of each portion.

Figure 25:
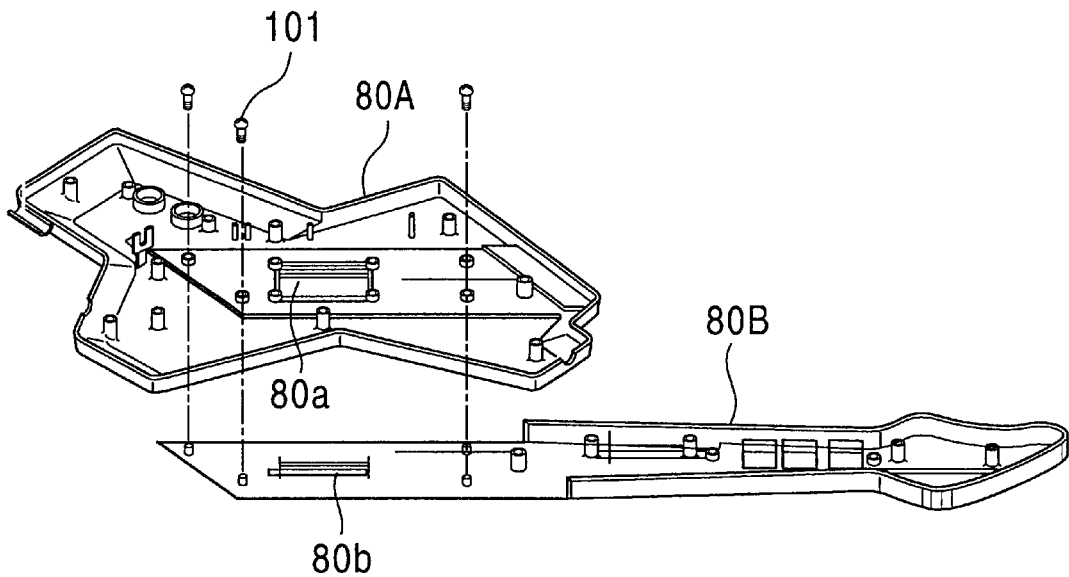
FIG. 25 is a disassembled perspective view for describing the assembly process of the mimic guitar shown in FIG. 22.

First, as shown in FIG. 25, the neck unit 80B is attached to the main body 80A via screws 101. At this time, the attaching is performed such that both openings 80a and 80b match. Subsequent processes can be performed for each part, and the order does not matter.

Regarding the neck buttons R, G, B portion, this is conducted as follows. As shown in FIG. 24, the neck buttons R, G, B are attached to the neck unit 80B, push switches 90 are mounted on the neck buttons R, G, B, a substrate 91 is mounted thereupon, and the whole is fixed by screws 97.

Figure 26:
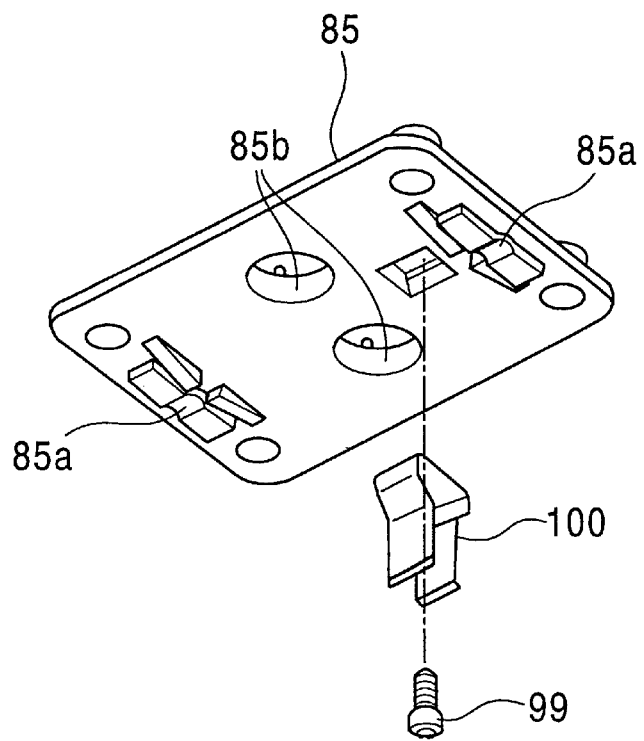
FIG. 26 is a disassembled perspective view for describing the assembly process of the mimic guitar shown in FIG. 22.
Figure 27:
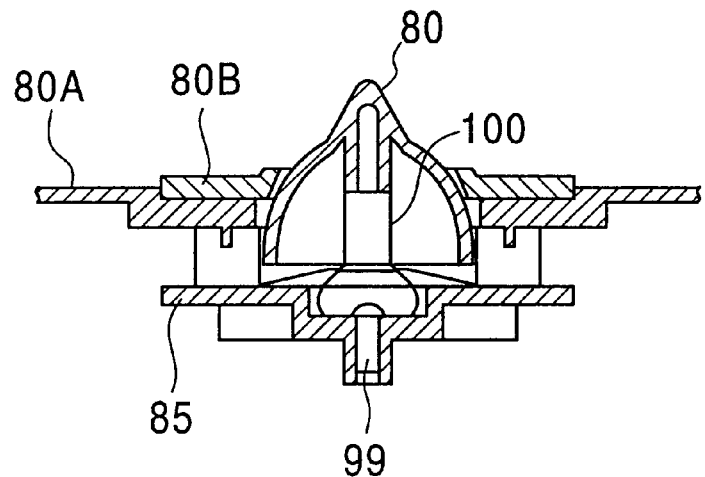
FIG. 27 is a cross-sectional view for describing the assembly process of the mimic guitar shown in FIG. 22.

Also, regarding the portion of the picking unit 83, this is performed as follows. First. The picking blade 84 is placed in the opening 80a of the main body 80A with the apex 841 downwards, and the attachment member 85 is mounted thereupon with the bearing portions 85a facing down. At this time, the attachment member 85 has an elastic nipping member 100 having a general shape of a box with one side open attached by a screw 99, as shown in FIG. 26. A the time of mounting the attachment member 85 onto the picking blade 84, the protrusion 842 is inserted between the two nipping portions 100a of the elastic nipping member 100, and at that time, two protrusions 842 are symmetrically provided in the longitudinal direction of the picking blade 84 as described above, so there is no problem in the event that the picking blade 84 itself is attached backwards in the longitudinal direction. Next, push switches 86 are attached to the two attachment holes 85b provided to the attachment member 85, a substrate 87 is mounted thereupon, and the whole is fixed with screws 95. FIG. 27 is a cross-sectional view illustrating the elastic nipping member 100 following fixing thereof.

Figure 28:
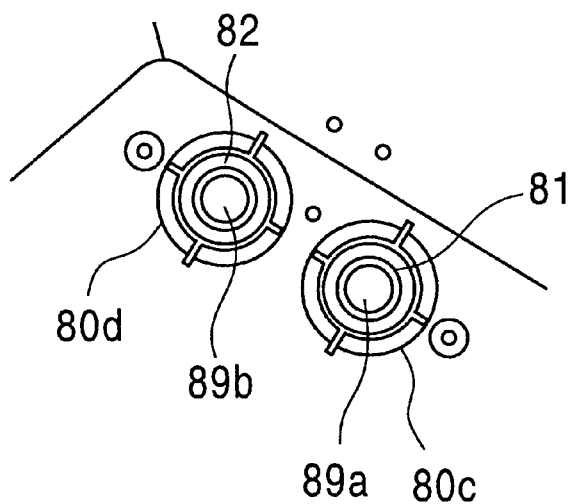
FIG. 28 is a plan diagram for describing the assembly process of the mimic guitar shown in FIG. 22.

Also, regarding the portion of the push switches 81 and 82, the following is carried out. First, as shown in FIG. 24 and FIG. 28, the push switches 81 and 82 are attached to the openings 80c and 80d of the main body 80A, and switch elements 89a and 89b are attached thereupon, following which a substrate 88 is provided over the same and is fixed by screws 96.

Also, regarding the portions other than the above, i.e., the protective member 94 for protecting the cord 87a electrically connected with the substrate 87, and the strap attaching members 92 and 93 for attaching a strap to the mimic guitar 80 for hanging on the shoulder, these are attached to recesses formed around the main body 80A.

Accordingly, with a mimic guitar 80 manufactured by such a process, the picking blade 84 is easily supported by the elastic nipping member 100 simply by inserting the protrusion 842 between two nipping portions 100a, and also subsequent member attachment is performed unrelated to the supported state of the picking blade 84, so assembly can be carried out easier than mimic guitars of a configuration which uses a coil spring for the picking unit 83.

Incidentally, with the mimic guitar 80, an elastic nipping member 100 having a general shape of a box with one side open is used, but the present invention is not restricted to this. For example, an elastic nipping member consisting only of two nipping portions 100a, or an elastic nipping member 100 having only the portion which nips the protrusion 842 formed so as to have the general shape of a box and the linking portion situated therebetween formed as a plate of elastic material, may be used.

As described above, the rhythm game apparatus is comprised of: a rhythm sound data storage device for storing a plurality of selective sound types (or groups) and a series of rhythm sounds in each selective type or group; a display device for displaying image data concerning occurrences of sounds in each sound group with time passing; a sound generation device; an instrumental unit integrally comprising an sound group selector for selecting a sound group and an instructor for instructing generation of a sound in the sound group selected by the sound group selector to the sound generation device; a judging means for judging whether or not the sound selected by the sound group selector is instructed by the instructor within a predetermined time; a sound generation controller for generating at least background sound to the sound generation device; and an evaluator for comparing the operating timing of the instructor and the timing of the displayed instruction, and for evaluating the instruction operation based on a total of differences therebetween.

Also, the rhythm game production method comprises the steps of: displaying a plurality of selective sound types or groups and a sequence of rhythm sounds in each type (or group) with time passing, allowing the game player to instruct generation of a sound in a selected sound group; and judging whether or not the sound is instructed within a predetermined time; comparing the instruction timing and the predetermined sound generation timing; and evaluating the instruction operation based on a total of differences therebetween.

The computer-readable storage medium stores the program comprising the steps of displaying a plurality of selective sound types (or groups) and a sequence of rhythm sounds in each type or group with time passing, allowing the game player to instruct generation of a sound in a selected sound group; and judging whether or not the sound is instructed within a predetermined time; comparing the instruction timing and the predetermined sound generation timing; and evaluating the instruction operation based on a total of differences therebetween.

The sound generation control is performed by the sound group selection and the generation instruction, so a rhythm-matching game can be enjoyed relatively easily in a manner closer to real playing of an instrument. Also, operation evaluation can be performed for players who have operated only by listening to background music.

In other words, the inventive rhythm game apparatus performs a rhythm-matching game with sound generation input by operation of the player. Accordingly, there are provided rhythm selecting means of selecting and instructing a correct sound with respect to a played music piece; and a rhythm input instrumental unit having an instruction means for instructing generation of the rhythm sound; a first storage device (PCM data storing unit 12) for storing sound generation data for each sound in the played music piece; second storage device (main RAM 13) for storing the sound generation data for each sound in the played music piece and the true generation timing data thereof, and also storing score points data according to the degree of matching of these, and also storing programs stipulating the sound generation control procedures and rhythm input operating evaluating procedures; sound generation controller for following the sound generation control procedures to read out the aforementioned sound generation data according to the input of the generation signals from the aforementioned rhythm input instrumental unit so as to perform control of one sound generation of the played music piece; and an instruction operation evaluator for following the rhythm input operating evaluating procedures to compare the instruction timing of the aforementioned instruction means and the true generation timing data, and evaluating the instruction operation for score points data corresponding to the degree of matching thereof, so as to add score points. The second storage means stores notes display control procedures; and also comprising a monitor capable of displaying images; graphic storage means for storing notes screen data of the instruction operation for visually guiding the instruction operation with the rhythm input instrumental unit; and a display device for updating the notes screen data following the notes display control procedures in a manner corresponding to the time-system group of the played music piece, and performing display control on the monitor so as to display whether or not there has been a miss in operation with the rhythm input instrumental unit.

The inventive rhythm game method performs rhythm-matching with sound generation input by operation of the player, and comprises the steps of: outputting a notes display screen to the display means for visually guiding the instruction operation with the instrumental unit; obtaining the degree of matching between the instruction timing of a sound in the selected sound group and the true instruction timing; outputting closer sound data according to this degree of matching to sound generation device; and evaluating instruction operation for score points data corresponding to this degree of matching and adding the score points.

Moreover, the computer-readable storage medium stores a program capable of executing the steps of: performing rhythm-matching with sound generation input by operation of the player: outputting a notes display screen for visually guiding the instruction operation with the instrumental unit; obtaining the degree of matching between the instruction timing and the true generation time; outputting closer sound data according to this degree of matching to sound generation device; and evaluating instruction operation for score points data corresponding to this degree of matching and adding the score points.

According to these configurations, the sound generation control and instruction operation evaluation may be performed by the sound group selection and the generation instruction. Accordingly, a rhythm-matching game can be enjoyed relatively easily in a manner closer to real playing of an instrument. Also, when conducting this rhythm game, the changing sound group selection and the generation instruction timing may be displayed on the monitor. Thus, the rhythm-matching game can be performed in an easier manner, such that the rhythm-matching game can be played for even relatively difficult pieces.

Also, another aspect of the present invention, there are provided a rhythm sound data storage device for correlating identification symbols to each sound data of a played musical piece including at least rhythm sound, and for storing the same; a display means; a display device for sequentially displaying on the display means a plurality of identification marks indicating the identification symbols corresponding with each piece of sound data comprising the played musical piece, and also for instructing the operating timing corresponding to each identification mark being displayed; a sound generation device; an instrumental unit integrally comprising an sound group selector having a selection portion equivalent to the type of the identification mark for selectively instructing an identification mark corresponding to the sound data of the rhythm sound data storage device and an instructor for instructing the generation of the sound corresponding to the identification mark selected by the sound group selector to the sound generation device; a judging means for judging whether or not the sound data selected by the sound group selector is instructed as operating timing within the certain interval by the instructor; a sound generation controller for generating at least background sound to the sound generation device; and an evaluator for comparing the operating timing of the instructor as to the sound data instructed as the operating timing and the timing of the operating timing display instruction, and for evaluating the instruction operation from the difference amount thereof.

Also, the sound generation controller may be made to output sound data instructed as the operating timing to the sound generation device so as to generate sound, at the point that the sound generation instructing member is operated in a state that the judging means has affirmed, at the operating timing of the user. Further, as described above, the sound generation controller may be made to output sound data instructed as the operating timing to the sound generation device so as to generate sound, at each certain point in a state that the judging means has affirmed, such that sound is generated at each certain point by the sound generation controller. In this case as well, the same advantages of the above aspect of the present invention are exhibited.

The evaluator may evaluate based on the total difference amount obtained by accumulating the difference amount to each piece of sound data. Further, as described above the evaluator may set a tolerance range before and after the operating timing for each sound data, and calculate score by accumulating addition parameters set according to the smallness of the amount of being off within the inner side of the boundary of the tolerance range as a reference thereof, and subtraction parameters set according to the greatness of the amount of being off at the outer side thereof. Though this arrangement is such wherein the higher the score is, the higher the skill is deemed to be, but an arrangement may be made wherein the higher the score is, the lower the skill is deemed to be.

According to these configurations, the sound generation control and instruction operation evaluation is performed by the sound group selection and the generation instruction, so not only can evaluation be made by listening to the sounds produced by the player himself/herself or others, accurate evaluation can be made with evaluation standards, so particularly two can play and compete based on the evaluation standards, enabling the rhythm-matching game to be even more fair and enjoyable.

Further, as described above, the sound data may contain at least either of scales or chords. According to this configuration, the sounds generated by sound generation instruction have a rich variety, and the rhythm-matching game can be further enjoyed.

The display device may comprise: a graphic storage device for storing notes screen data for visually guiding the instruction operation by the instrumental unit; and a graphic controller sequentially updating the notes screen data according to the group of the time-system of the played music piece, and also for displaying whether or not there has been a miss in the input operation by the instrumental unit. According to the above configuration, sound generation instruction is performed with the notes screen as a guide, so the rhythm-matching game can be easily played for even relatively difficult played music pieces. Also, misses in the input operation are displayed on the notes screen in real-time, so the player can identify and immediately correct his/her mistake in real-time, thereby allowing the rhythm-matching game to be enjoyed at an even higher level.

Regarding the instrumental unit, one of the input means for the right hand of the player and the input means for the left hand of the player may comprise the sound group selector, and the other comprise the instructor. Also, as described above, regarding the instrumental device, one of the input means for the right hand of the player and the input means for the left hand may comprise the sound group selector, and the other comprise the sound generation instructing member.

According to this configuration, the rhythm-matching game can be played using the right hand and left hand in a manner closer to reality.

The instrumental unit may have a form mimicking that of a guitar, the sound group selector configured of a plurality of neck buttons corresponding to the series of rhythm sound types, and the instructor configured of one picking unit. Also, the instrumental device described above may have a form mimicking that of a guitar, wherein the sound group selector is configured of a plurality of neck buttons corresponding to the series of rhythm sound types, and the instructor is configured of one picking unit.

According to this configuration, the rhythm game apparatus according to the present invention can be easily applied to playing with a mimic guitar.

The picking unit may comprise: a picking blade provided swingably; a restoring mechanism for restoring a blade portion of the picking blade to a reference position with respect to the instrumental unit; and a swing detector for detecting the swing of the picking blade to determine a sound generation timing.

According to this configuration, the picking unit can be obtained wherein a simpler configuration can be used to obtain a realistic feel close to that of picking a mimic guitar, and more precise instruction timing can be made.

It may be appreciated to provide a pair of elastic members below the picking blade. One member of the pair is provided on one swing side while the other member is provided on the other swing side. It may be, also, appreciated that the picking blade is formed with a protrusion extending inside, and the restoring mechanism includes an elastic support holding the protrusion in a swingable manner. Also, as described above, the picking blade may be provided swingably with respect to the instrumental unit and also have a protrusion protruding from the inner plane thereof toward the inner side of the instrumental unit, and the restoring mechanism have an elastic nipping member for nipping the protrusion from both sides of the swinging direction of the picking blade and also support the picking blade in a swingable manner; and the picking blade is supported at the reference position by elastic nipping pieces by inserting the protrusion in the portion for nipping the protrusion of the elastic nipping member.

In the case a configuration described above, by inserting the protrusion of the picking blade into the portion of the elastic nipping member for nipping the protrusion, the picking blade is supported thereby, so the picking blade can be easily attached, and ease of attaching the picking blade can be improved over the case of another above-described arrangement. Particularly in the case of the invention described in the previous paragraph, by inserting the protrusion of the picking blade into the portion of the elastic nipping member for nipping the protrusion, the picking blade is supported in the reference position, which is even more preferable.

Further, the sound generation controller may be provided with: a difference amount detector for detecting a difference between the sound generation length of the sound data according to the sound generation instruction from the instrumental unit and the time range of generating sound of the sound data; and sound generation control means for outputting to the sound generation device the sound data of the side containing more sound generation length of sound data according to the sound generation instruction, in the time range for generating sound of continuing sound data. According to the above configuration, outputting sound generation based on the degree of matching of the sound group selection and the instruction timing makes for a less unnatural sound generation corresponding with the playing.

Further, the rhythm input operating evaluator may perform adding of scored points in the event that the position of the instrumental unit is changed at a certain period in the played music piece. According to this configuration, changing the way of holding the rhythm input instrumental unit with the sensation of a live performance, such as raising along with the music in the case of a mimic guitar for example, allows the rhythm-matching game to be enjoyed more.

The sound generation control and instruction operation evaluation are performed by the sound group selection and the instruction timing. Accordingly, a rhythm-matching game can be enjoyed relatively easily in a manner closer to a realistic state of playing an instrument.

The sound generation control and instruction operation evaluation is performed by the sound group selection and the instruction timing, so not only can evaluation be made by listening to the sounds produced by the player himself/herself or others, accurate evaluation can be made with evaluation standards, so particularly two can play and compete based on the evaluation standards, enabling the rhythm-matching game to be even more fair and enjoyable.

The sounds generated by sound generation instruction have a rich variety, and the rhythm-matching game can be further enjoyed.

The sound generation instruction is performed with the notes screen as a guide, so the rhythm-matching game can be easily played for even relatively difficult pieces. Also, misses in the input operation are displayed on the notes screen in real-time, so the player can identify and immediately correct his/her mistake in real-time, thereby allowing the rhythm-matching game to be enjoyed at an even higher level.

The sound generation based on the degree of matching of the sound group selection and the instruction timing makes for a less unnatural sound generation corresponding with the playing.

Changing the way of holding the rhythm input instrumental unit with the sensation of a live performance, such as raising along with the music in the case of a mimic guitar for example, allows the rhythm-matching game to be enjoyed more.

The rhythm-matching game can be played using the right hand and left hand in a manner closer to reality.

The rhythm game apparatus according to the present invention can be easily applied to playing using a mimic guitar.

The picking unit can be obtained wherein a simpler configuration can be used to obtain a realistic feel close to that of picking a mimic guitar, and more precise instruction timing can be made.

In the case of another configuration described above, inserting the protrusion of the picking blade into the portion of the elastic nipping member for nipping the protrusion allows the picking blade to be supported thereby, so the picking blade can be easily attached, and ease of attaching the picking blade can be improved over the case of using the elastic means in another configuration also described above. Particularly, in the case of the invention described in the above-note paragraph, by inserting the protrusion of the picking blade into the portion of the elastic nipping member for nipping the protrusion, the picking blade is supported in the reference position, which is even more preferable.

The sound generation based on the degree of matching of the sound group selection and the instruction timing makes for a less unnatural sound generation corresponding with the playing.

Changing the way of holding the rhythm input instrumental unit with the sensation of a live performance, such as raising along with the music in the case of a mimic guitar for example, allows the rhythm-matching game to be enjoyed more.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A rhythm game apparatus, comprising:
    a sound data storage device which stores at least data concerning sounds, the sounds being sorted into a plurality of selective sound groups;
    a display device which displays occurrences of sounds in each of the plurality of selective sound groups in accordance with time passing;
    an instrumental unit to which a game player operates, the instrumental unit being provided with:
        a sound group selector which is to be operated by the game player to select a sound group, and
        an instructor which is to be operated by the game player to instruct generation of a sound;
    an evaluator which evaluates the operation of the game player based on a time gap between an instruction timing of the instructor and a predetermined timing of a sound in a selected sound group.

2. A rhythm game apparatus according to claim 1, further comprising a sound generator which generates an instructed sound.

3. A rhythm game apparatus according to claim 2, further comprising a judger which judges whether the instruction timing of the instructor is within an allowable time range of the sound, wherein the sound generator generates the sound when the instruction timing is within the allowable time range.

4. A rhythm game apparatus according to claim 2, further comprising a judger which judges whether the instruction timing of the instructor is within an allowable time range of the sound, wherein the sound generator generates the sound at a predetermined interval when the instruction timing is within the allowable time range.

5. A rhythm game apparatus according to claim 1, wherein the evaluator evaluates the operation of the game player based on a total of differences with respect to a predetermined number of sounds.

6. A rhythm game apparatus according to claim 1, wherein the evaluator has for evaluation an addition parameter for a difference within a predetermined tolerance range and a subtraction parameter for a difference out of the predetermined tolerance range.

7. A rhythm game apparatus according to claim 1, further comprising a sound generator operable to generate a background sound.

8. A rhythm game apparatus according to claim 1, wherein the sound data is selected from the group consisting of scale date and chord data.

9. A rhythm game apparatus according to claim 1, wherein the display device comprises:
 a graphic storage device which stores note screen data for visually guiding the instruction operation; and
 a graphic generator which generates an updated note screen in accordance with time passing, and an updated failure screen indicative of whether or not the instruction timing is within the allowable range.

10. A rhythm game apparatus according to claim 1, wherein one of the sound group selector and the instructor is arranged for the right hand of the game player, and the other is arranged for the left hand.

11. A rhythm game apparatus according to claim 1, wherein the instrumental unit is in the form of a guitar, the sound group selector is configured into a plurality of neck buttons corresponding to the plurality of sound groups, respectively, and the instructor is configured into a picking unit.

12. A rhythm game apparatus according to claim 11, wherein the picking unit comprises:
 a picking blade provided swingably;
 a restoring mechanism for restoring a blade portion of the picking blade into a reference position with respect to the instrumental unit; and
 a swing detector for detecting a swing of the picking blade to determine a sound generation timing.

13. A rhythm game apparatus according to claim 12, wherein the restoring mechanism includes a pair of elastic members provided below the picking blade, one member of the pair being arranged on one swing side and the other member being arranged on the other swing side.

14. A rhythm game apparatus according to claim 12, wherein the picking blade is formed with a protrusion extending inside, and the restoring mechanism includes an elastic member for holding the protrusion of the picking blade in a swingable manner.

15. A rhythm game apparatus according to claim 1, further comprising a posture detector for detecting whether the instrumental unit is placed in a particular posture in a predetermined time, wherein the evaluator gives an additional score to the evaluation when the instrumental unit is placed in the particular posture in the predetermined time.

16. An instrumental device for use with a rhythm game apparatus including a sound data storage device which stores at least data concerning sounds, the sounds being sorted into a plurality of selective sound groups, a display device which displays occurrences of sounds in each of the plurality of selective sound groups in accordance with time passing, a sound generator which generates a sound, the instrumental device comprising:
 a sound group selector which is to be operated by one of the both hands of a game player to select a sound group; and
 an instructor which is to be operated by the other hand of the game player to instruct the sound generator to generate a sound.

17. An instrumental device according to claim 16, wherein the instrumental device is in the form of a guitar, the sound group selector is configured into a plurality of neck buttons corresponding to the plurality of sound groups, respectively, and the instructor is configured into a picking unit.

18. An instrumental device according to claim 17, wherein the picking unit comprises:
 a picking blade provided swingably;
 a restoring mechanism for restoring a blade portion of the picking blade into a reference position with respect to the instrumental unit; and
 a swing detector for detecting a swing of the picking blade to determine a sound generation timing.

19. An instrumental device according to claim 18, wherein the restoring mechanism includes a pair of elastic members provided below the picking blade, one member of the pair being arranged on one swing side and the other member being arranged on the other swing side.

20. An instrumental device according to claim 18, wherein the picking blade is formed with a protrusion extending inside, and the restoring mechanism includes an elastic member for holding the protrusion of the picking blade in a swingable manner.

21. A method for producing a rhythm game, comprising the steps of:
 giving a game player a visual display of occurrences of sounds in each of a plurality of selective sound groups in accordance with time passing;
 detecting a time gap between a predetermined generation timing of a sound in a selected sound group and an instruction timing of the game player to judge whether the sound is allowed to be generated;
 generating the particular sound based on the judgment; and
 evaluating the operation of the game player based on the detected time gap.

22. A method according to claim 21, wherein the game player is given a background music in connection with the displayed sound occurrences.

23. A computer-readable storage medium storing a program of executing the steps:
 giving a game player a visual display of occurrences of sounds in each of a plurality of selective sound groups in accordance with time passing;
 detecting a time gap between a predetermined generation timing of a sound in a selected sound group and an instruction timing of the game player to judge whether the sound is allowed to be generated;
 generating the particular sound based on the judgment; and
 evaluating the operation of the game player based on the detected time gap.

24. A computer-readable storage medium according to claim 23, wherein the game player is given a background music in connection with the displayed sound occurrences.

* * * * *

(12) INTER PARTES REEXAMINATION CERTIFICATE (894th)
United States Patent
Toyama et al.

(10) Number: US 6,225,547 C1
(45) Certificate Issued: Jun. 19, 2014

(54) RHYTHM GAME APPARATUS, RHYTHM GAME METHOD, COMPUTER-READABLE STORAGE MEDIUM, AND INSTRUMENTAL DEVICE

(75) Inventors: Motoki Toyama, Kobe (JP); Shigehito Mukasa, Kobe (JP); Toru Okubo, Kobe (JP); Tomoya Yamano, Kobe (JP)

(73) Assignee: Konami Digital Entertainment Co., Ltd., Minato-Ku, Tokyo (JP)

Reexamination Request:
No. 95/000,410, Oct. 27, 2008

Reexamination Certificate for:
Patent No.: 6,225,547
Issued: May 1, 2001
Appl. No.: 09/429,545
Filed: Oct. 28, 1999

(30) Foreign Application Priority Data

Oct. 30, 1998 (JP) .................................... 10-326145
Jul. 28, 1999 (JP) .................................... 11-214435

(51) Int. Cl.
*A63F 13/00* (2014.01)
*G10H 1/00* (2006.01)
*G10H 1/40* (2006.01)

(52) U.S. Cl.
USPC ................... 84/611; 84/609; 84/635; 84/649; 84/651; 84/667

(58) Field of Classification Search
None
See application file for complete search history.

(56) References Cited

To view the complete listing of prior art documents cited during the proceeding for Reexamination Control Number 95/000,410, please refer to the USPTO's public Patent Application Information Retrieval (PAIR) system under the Display References tab.

*Primary Examiner* — Albert J Gagliardi

(57) ABSTRACT

Sound generation control and instruction operation evaluation is performed by sound group selection and a sound generation instruction, with a mimic guitar having selection buttons for selecting one of a plurality of sound groups bearing a series of sounds, and a picking blade for instructing the generation of a sound. The rhythm-matching game can be enjoyed relatively easily in a manner closer to a realistic state of playing an instrument.

At the time of issuance and publication of this certificate, the patent remains subject to pending reissue application number 11/535,462 filed Sep. 6, 2006. The claim content of the patent may be subsequently revised if a reissue patent is issued from the reissue application.

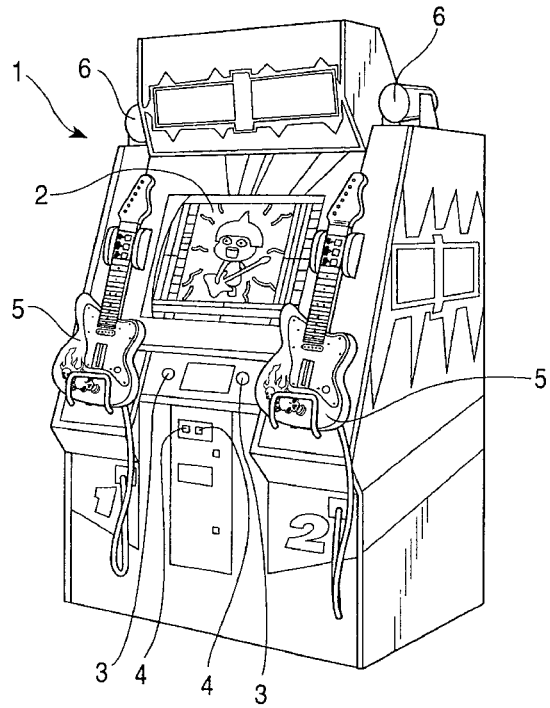

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21-24 is confirmed.

Claims 1-20 are cancelled.

New claims 25-42 are added and determined to be patentable.

*25. A method for producing a rhythm game comprising the steps of:*
  *giving a game player a visual display of occurrences of sounds in each of a plurality of selective sound groups in accordance with time passing, said visual display includes a display of the plurality of selective sound groups in an array;*
  *detecting a time gap between a predetermined generation timing of a sound in a selected sound group and an instruction timing by the game player of a selected sound group from the plurality of selective sound groups to judge whether the sound is allowed to be generated, wherein the selected sound group is selected by selecting a sound group selector with one hand of the game player and the instruction timing is instructed by an instructor with the other hand of the game player;*
  *generating the particular sound based on the judgment; and*
  *evaluating the operation of the game player based on the detected time gap.*

*26. A method for producing a rhythm game comprising the steps of:*
  *giving a game player a visual display of occurrences of sounds in each of a plurality of selective sound groups in accordance with time passing;*
  *detecting a time gap between a predetermined generation timing of a sound in a selected sound group and an instruction timing of the game player to judge whether the sound is allowed to be generated;*
  *generating the particular sound based on the judgment; and*
  *evaluating the operation of the game player based on the detected time gap;*
  *wherein said visual display includes a display of the plurality of selective sound groups in an array.*

*27. A method according to claim 21, wherein said step of detecting a time gap comprises detecting a time gap between a predetermined generation timing of a sound in a selected sound group and an instruction timing by the game player of a selected sound group from the plurality of selective sound groups to judge whether the sound is allowed to be generated, and*
  *wherein the selected sound group is selected by selecting a sound group selector with one hand of the game player and the instruction timing is instructed by an instructor with the other hand of the game player.*

*28. A method according to claim 21, wherein a sound group is selected by selecting at least one of a plurality of neck buttons on a guitar-shaped device which correspond to the plurality of selective sound groups, respectively, and an instructor on the guitar-shaped device is instructed independently from the plurality of the neck buttons by the game player.*

*29. A method according to claim 28, further comprising detecting the angle of the guitar-shaped device;*
  *wherein evaluating the operation of the game player further comprises evaluating the operation of the game player based on whether the guitar-shaped device has a predetermined angle.*

*30. A method according to claim 29, wherein the predetermined angle of the guitar-shaped device comprises the plurality of neck buttons of the guitar-shaped device positioned vertically above the instructor of the guitar-shaped device.*

*31. A method according to claim 29, wherein when it is detected that the guitar-shaped device has the predetermined angle, giving the game player a visual indication that the predetermined angle of the guitar-shaped device has been detected.*

*32. A method according to claim 21, wherein a plurality of said plurality of selective sound groups occur simultaneously; and*
  *wherein said sound group selector and said instructor are actuated independently.*

*33. A method according to claim 21, wherein the visual display includes a display of tracks, each track corresponding to a selective sound group in the plurality of selective sound groups and each track including indicators that move along the track, wherein an indicator indicates the predetermined generation timing of the sound group represented by the track when the indicator reaches a reference line; and*
  *wherein said sound group selector and said instructor are actuated independently.*

*34. A computer-readable storage medium storing a program of executing the steps:*
  *giving a game player a visual display of occurrences of sounds in each of a plurality of selective sound groups in accordance with time passing, said visual display includes a display of the plurality of selective sound groups in an array;*
  *detecting a time gap between a predetermined generation timing of a sound in a selected sound group and an instruction timing by the game player of a selected sound group from the plurality of selective sound groups to judge whether the sound is allowed to be generated, wherein the selected sound group is selected by selecting a sound group selector with one hand of the game player and the instruction timing is instructed by an instructor with the other hand of the game player;*
  *generating the particular sound based on the judgment; and*
  *evaluating the operation of the game player based on the detected time gap.*

*35. A computer-readable storage medium storing a program of executing the steps:*
  *giving a game player a visual display of occurrences of sounds in each of a plurality of selective sound groups in accordance with time passing;*
  *detecting a time gap between a predetermined generation timing of a sound in a selected sound group and an instruction timing of the game player to judge whether the sound is allowed to be generated;*
  *generating the particular sound based on the judgment; and* evaluating the operation of the game player based on the detected time gap;

wherein said visual display includes a display of the plurality of selective sound groups in an array.

36. A computer-readable storage medium according to claim 23, wherein said step of detecting a time gap comprises detecting a time gap between a predetermined generation timing of a sound in a selected sound group and an instruction timing by the game player of a selected sound group from the plurality of selective sound groups to judge whether the sound is allowed to be generated, and wherein the selected sound group is selected by selecting a sound group selector with one hand of the game player and the instruction timing is instructed by an instructor with the other hand of the game player.

37. A computer-readable storage medium according to claim 23, wherein a sound group is selected by selecting at least one of a plurality of neck buttons on a guitar-shaped device which correspond to the plurality of selective sound groups, respectively, and an instructor on the guitar-shaped device is instructed independently from the plurality of the neck buttons by the game player.

38. computer-readable storage medium according to claim 37, further comprising detecting the angle of the guitar-shaped device;

wherein evaluating the operation of the game player further comprises evaluating the operation of the game player based on whether the guitar-shaped device has a predetermined angle.

39. A computer-readable storage medium according to claim 38, wherein the predetermined angle of the guitar-shaped device comprises the plurality of neck buttons of the guitar-shaped device positioned vertically above the instructor of the guitar-shaped device.

40. A computer-readable storage medium according to claim 38, wherein when it is detected that the guitar-shaped device has the predetermined angle, giving the game player a visual indication that the predetermined angle of the guitar-shaped device has been detected.

41. A computer-readable storage medium according to claim 23, wherein a plurality of said plurality of selective sound groups occur simultaneously; and wherein said sound group selector and said instructor are actuated independently.

42. A computer-readable storage medium according to claim 23, wherein the visual display includes a display of tracks, each track corresponding to a selective sound group in the plurality of selective sound groups and each track including indicators that move along the track, wherein an indicator indicates the predetermined generation timing of the sound group represented by the track when the indicator reaches a reference line; and wherein said sound group selector and said instructor are actuated independently.

* * * * *